(12) United States Patent
Ahmed et al.

(10) Patent No.: US 9,512,713 B2
(45) Date of Patent: Dec. 6, 2016

(54) WELL ACCESS TOOLS

(71) Applicant: Qatar Foundation, Doha (QA)

(72) Inventors: Shehab Ahmed, Doha (QA); Mohammad Fouad AlGammal, Doha (QA); Omar Abdelzaher Abdelzaher, Cairo (EG); Stephen M. Remmert, Memphis, TN (US); Ahmad F. Ahmad Zamri, Doha (QA); Calvin H. Myers, Doha (QA)

(73) Assignees: RASGAS COMPANY LIMITED, Doha (QA); QATAR FOUNDATION, Education, Doha (QA)

( * ) Notice: Subject to any disclaimer, the term of this patent is extended or adjusted under 35 U.S.C. 154(b) by 781 days.

(21) Appl. No.: 13/667,085

(22) Filed: Nov. 2, 2012

(65) Prior Publication Data

US 2013/0299188 A1 Nov. 14, 2013

Related U.S. Application Data

(60) Provisional application No. 61/554,713, filed on Nov. 2, 2011, provisional application No. 61/680,359, filed on Aug. 7, 2012.

(51) Int. Cl.
*E21B 47/01* (2012.01)
*G01V 11/00* (2006.01)
(Continued)

(52) U.S. Cl.
CPC ........... *E21B 47/01* (2013.01); *E21B 17/1014* (2013.01); *E21B 17/1057* (2013.01); *E21B 23/14* (2013.01); *G01V 11/005* (2013.01)

(58) Field of Classification Search
CPC .. E21B 17/1014; E21B 17/1057; E21B 47/01;
E21B 17/1021; E21B 47/024; E21B 47/09; E21B 7/06; E21B 19/24; E21B 43/119; E21B 23/14; E21B 23/004; G01V 11/005
(Continued)

(56) References Cited

U.S. PATENT DOCUMENTS 3,797,586 A * 3/1974 Coyne ................... B25D 17/08
173/133
4,171,031 A 10/1979 Marquis
(Continued)

FOREIGN PATENT DOCUMENTS

EP 1106777 A1 6/2001
WO 2010/141028 A1 12/2010

OTHER PUBLICATIONS

Canadian Office Action dated Jun. 10, 2015 for Canadian Application No. 2,854,465 (5 p.).

(Continued)

*Primary Examiner* — David Andrews
*Assistant Examiner* — Carib Oquendo
(74) *Attorney, Agent, or Firm* — Conley Rose, P.C.

(57) ABSTRACT

A telebending tool for conveying a logging tool into a wellbore includes a tool body having a central axis. In addition, the tool also includes a cam housing coupled to the tool body and a nose moveably coupled to the tool body through a pivoting member. Further, the telebending tool includes a compression spring positioned between the nose and the pivoting member, and a camming arm coupled to the nose. The camming arm extends coaxially through the pivoting member to selectively engage a cam pathway of the cam housing. The nose has a first position with a central axis of the nose coaxially aligned with the central axis of the (Continued)

body and a second position with the central axis of the nose oriented at an angle less than 180° relative to the central axis of the body.

19 Claims, 32 Drawing Sheets

(51) Int. Cl.
 *E21B 17/10* (2006.01)
 *E21B 23/14* (2006.01)
(58) Field of Classification Search
 USPC .................. 175/45; 166/254.2, 250.17, 381
 See application file for complete search history.

(56) References Cited

U.S. PATENT DOCUMENTS

| | | | |
|---|---|---|---|
| 5,415,238 A | 5/1995 | Nice | |
| 5,454,420 A | 10/1995 | Snider et al. | |
| 6,002,257 A | 12/1999 | Thomas et al. | |
| 6,092,610 A | 7/2000 | Kosmala et al. | |
| 6,209,645 B1 | 4/2001 | Ohmer | |
| 6,679,323 B2 * | 1/2004 | Vargervik | E21B 43/119 166/242.3 |
| 6,719,069 B2 | 4/2004 | Alft et al. | |
| 6,763,900 B2 | 7/2004 | Miszewski | |
| 7,093,370 B2 | 8/2006 | Hansberry et al. | |
| 7,225,881 B1 | 6/2007 | Bushnell | |
| 7,757,782 B2 | 7/2010 | Tashiro et al. | |
| 7,980,307 B2 | 7/2011 | Saylor | |
| 2001/0042621 A1 | 11/2001 | Leising | |
| 2005/0177309 A1 * | 8/2005 | Sri Ranjan | E21B 49/008 73/38 |
| 2005/0279498 A1 | 12/2005 | Nakajima et al. | |
| 2006/0157246 A1 | 7/2006 | Zeer | |
| 2008/0135293 A1 | 6/2008 | Tashiro et al. | |
| 2012/0061098 A1 * | 3/2012 | Hall | E21B 17/10 166/381 |

OTHER PUBLICATIONS

PCT/US2012/063165 International Search Report and Written Opinion dated Mar. 27, 2013 (10 p.) (2238-05303).
European Search Report dated Dec. 21, 2015, for European Application No. 12844672.1 (6 p.).
Canadian Office Action dated Apr. 4, 2016, for Canadian Application No. 2,854,465 (5 p.).
Australian Examination Report dated Aug. 4, 2016, for Australian Application No. 2012332346 (3 p.).

* cited by examiner

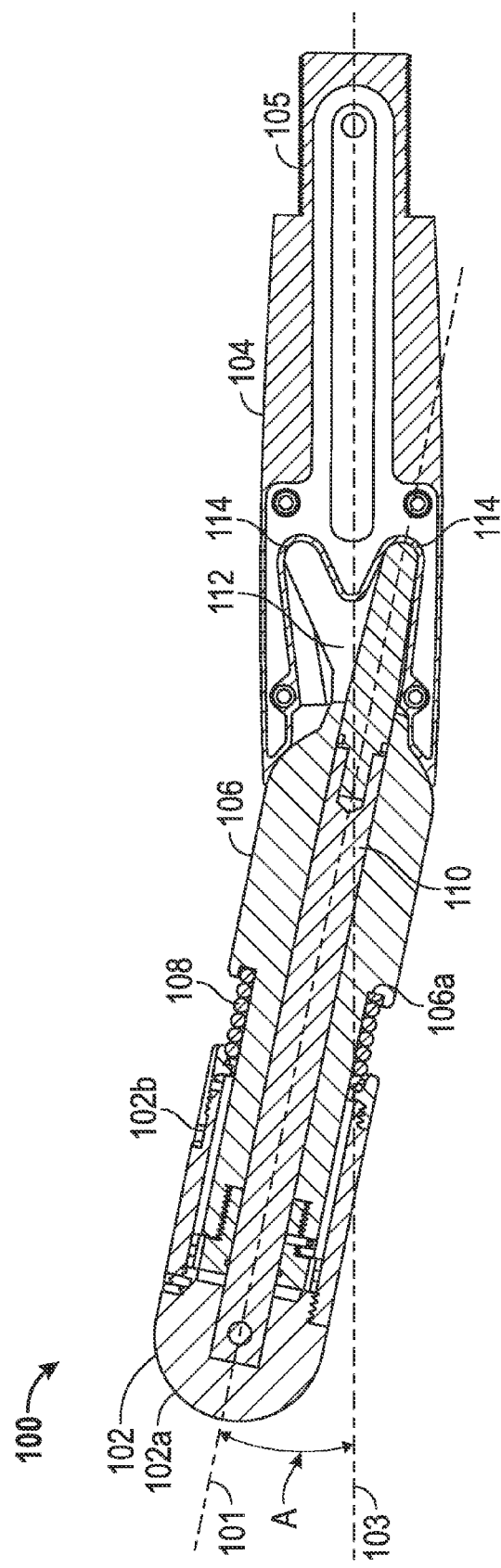

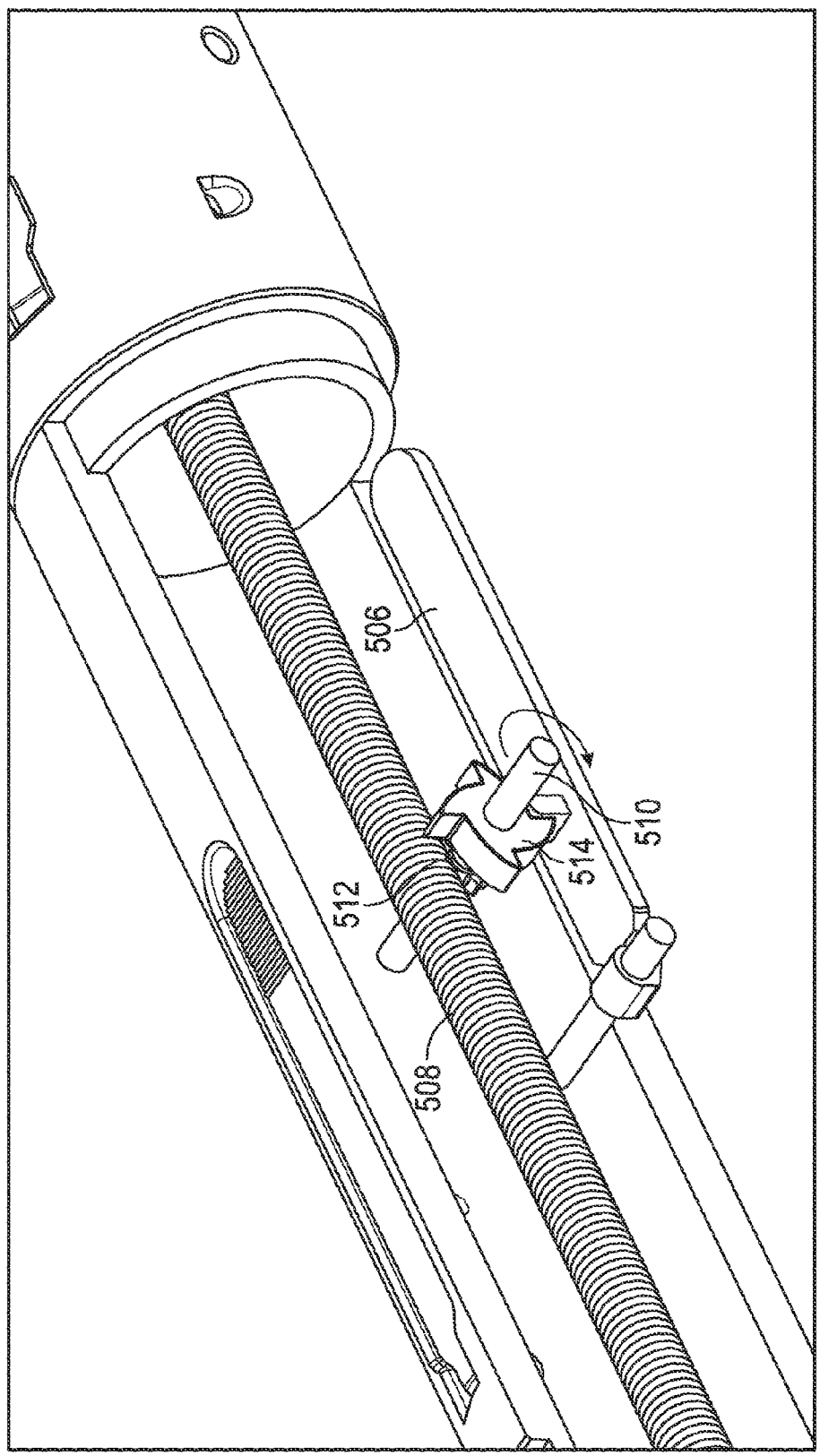

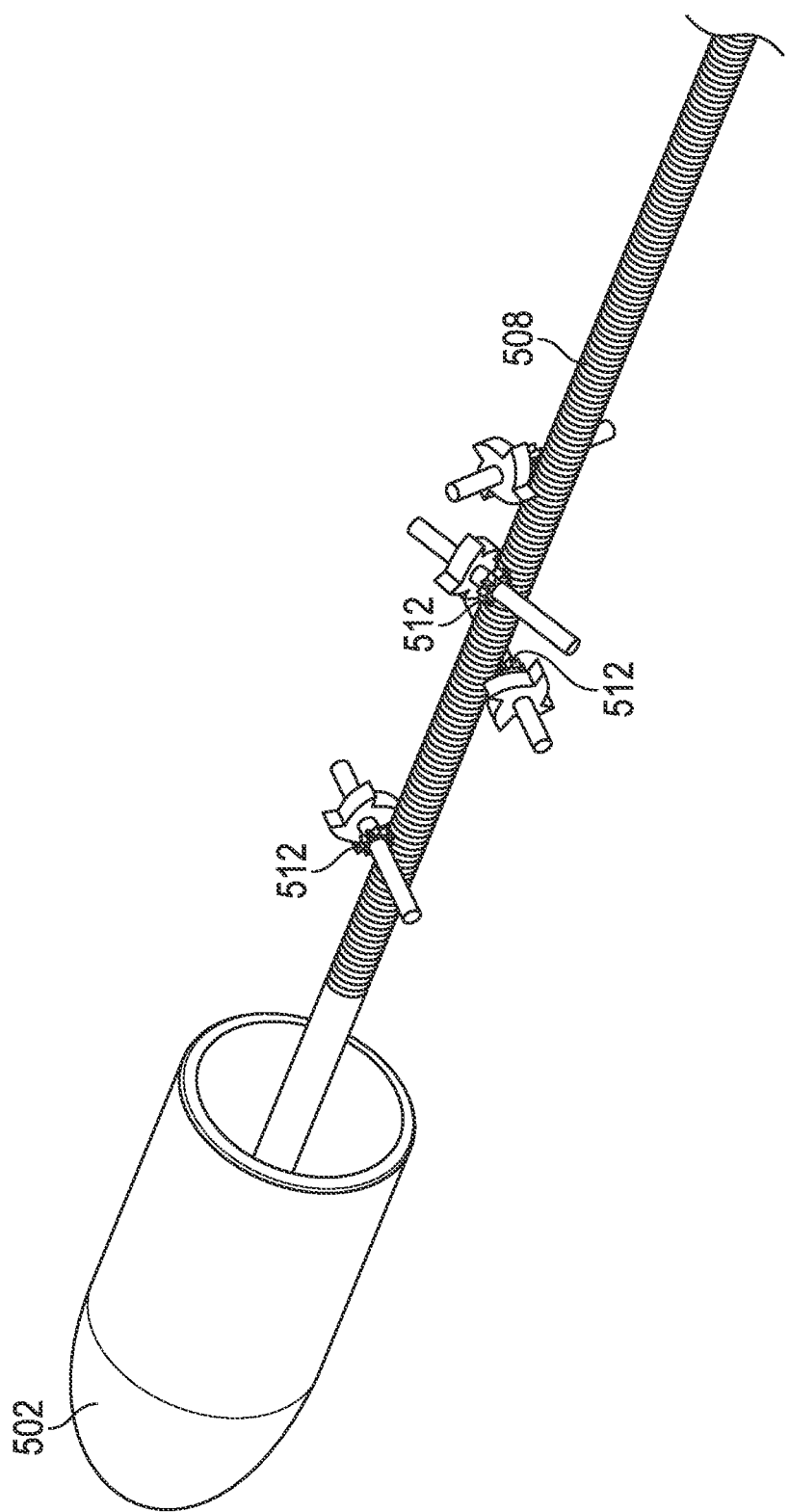

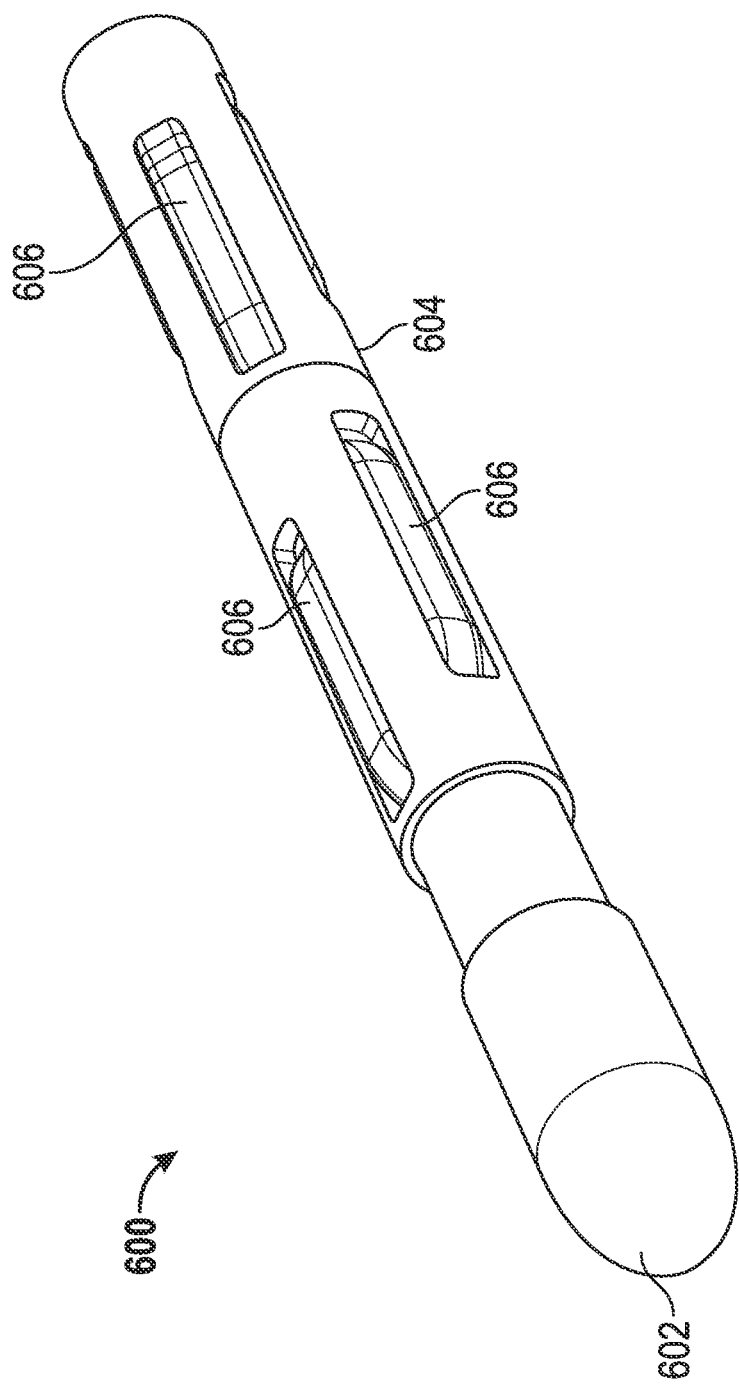

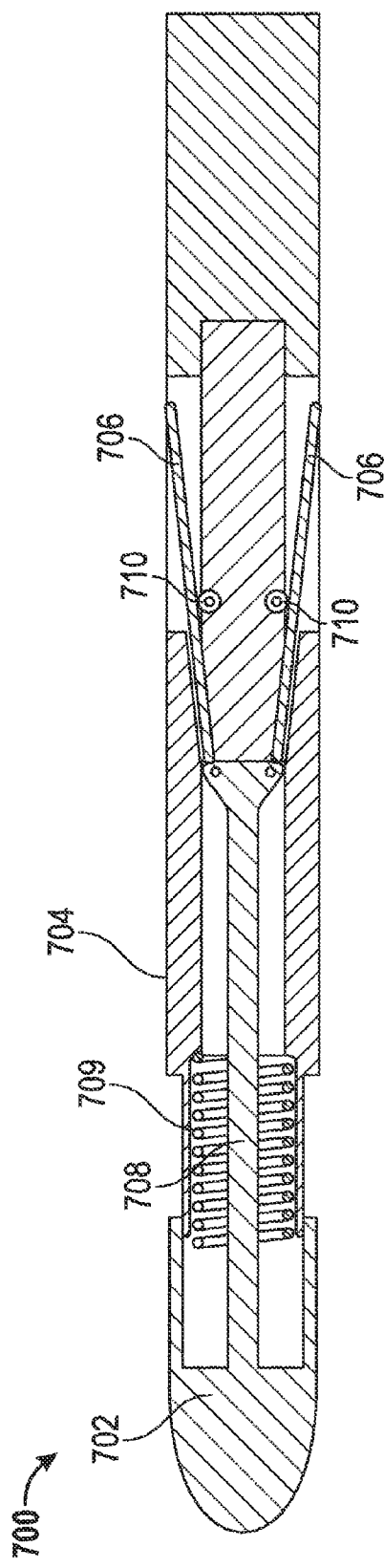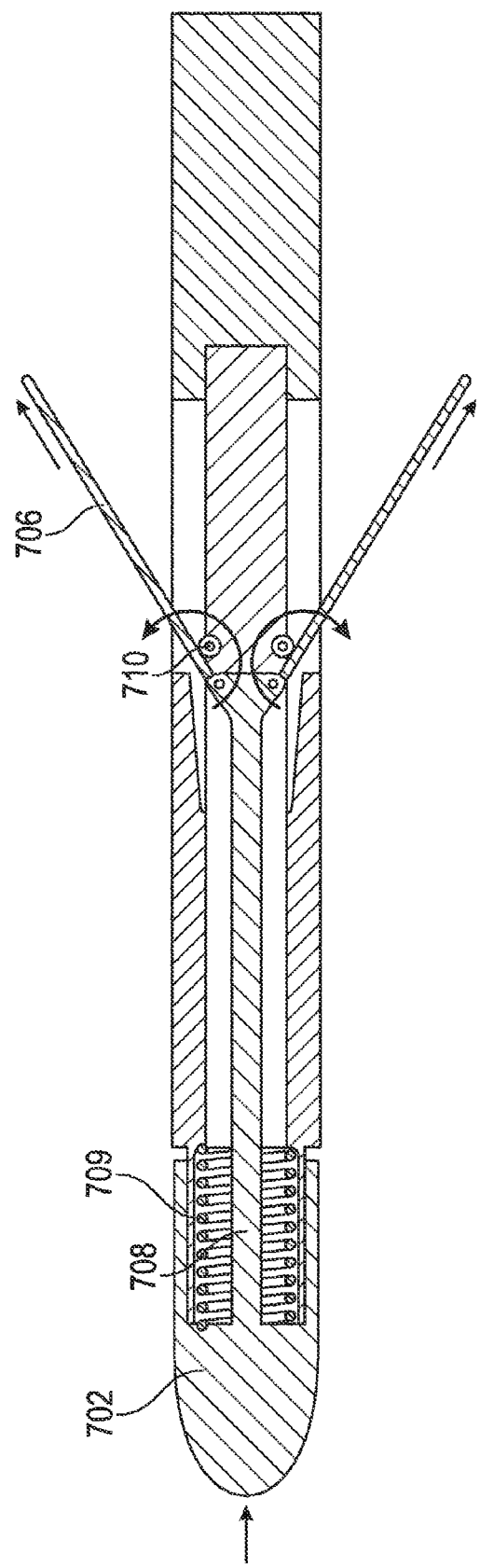
FIG. 7B
FIG. 7C

WELL ACCESS TOOLS

CROSS-REFERENCE TO RELATED APPLICATIONS

This application claims the benefit of U.S. provisional patent application Ser. No. 61/554,713 filed Nov. 2, 2011, and entitled "Well Access Telebending Tools," and U.S. provisional patent application Ser. No. 61/680,359 filed Aug. 7, 2012, and entitled "Well Access Tools," both of which are hereby incorporated herein by reference in their entirety.

STATEMENT REGARDING FEDERALLY SPONSORED RESEARCH OR DEVELOPMENT

Not applicable.

BACKGROUND

During drilling operations for the production of hydrocarbons, different earthen formations may be encountered along the wellbore. Certain formations may have a high amount of structural integrity, such that the wellbore through those formations has a diameter approximately equal to the full gage diameter of the drill bit used to drill the wellbore. However, other formations may have a lower amount of structural integrity due to being composed of softer materials (e.g., carbonates, clay). These softer formations are susceptible to breaking up or crumbling during drilling operations, creating a larger-diameter portion of the wellbore. Thus, the wellbore may take on an irregular, corrugated profile (a "rugose" bore) as a result of certain areas having a diameter approximately equal to the full gauge diameter of the drill bit and other areas having a larger diameter due to crumbling of the formation material.

In some situations, a logging toolstring may be conveyed into the wellbore (e.g., on the end of a wireline, coiled tubing, or drill pipe) to gather data, which may include common measurements such as pressure or temperature, or more advanced measurements such as rock properties, fracture analysis, fluid properties in the wellbore, or formation properties extending into the rock formation. However, the logging tool may not pass through rugose sections of the wellbore. If the logging tool becomes stuck, the tool may have to be retrieved and returned. The logging tool may be returned, for example, by using a tractor to push the tool downhole or by placing the logging tool at the end of a pipe string (e.g., drill string), both of which are time-consuming and costly. Alternately, the wellbore may be "cleaned" by circulating mud and a wiper tip through the wellbore, which is also time-consuming and introduces a further cost.

Accordingly, there remains a need in the art for devices and methods for guiding and navigating tools through rugose boreholes. Such devices and methods would be particularly well-received if they offered the ability to lower a logging tool on a wireline while preventing the tool from becoming stuck in the wellbore.

BRIEF DESCRIPTION OF THE DRAWINGS

For a detailed description of the preferred embodiments, reference will now be made to the accompanying drawings in which:

FIG. 1a is a cross-sectional view of an embodiment of a telebending tool in accordance with the principles described herein;

FIG. 1d is a transparent, partial cut-away view of the telebending tool of FIG. 1a;

FIG. 1e is an exploded view of the telebending tool of FIG. 1a;

FIG. 2b is a transparent, partial cutaway view of a dual-stage telebending tool of FIG. 2a;

FIG. 4b is an enlarged view of a cam housing and a tool body of the self-orienting telebending tool of FIG. 4a;

FIG. 4c is a perspective view of an embodiment of the self-orienting telebending tool of FIG. 4a;

FIG. 5b is a partial cross-sectional view of the tool of FIG. 5a;

FIG. 5c is a partial cross-sectional perspective view of the tool of FIG. 5a;

FIG. 5d is a perspective view of the internal actuation mechanism of the tool of FIG. 5a;

FIG. 6a is a perspective view of an embodiment of a downhole tool in accordance with the principles described herein including extendable glide break-free mechanisms;

FIG. 7b is a partial cross-sectional side view of the tool of FIG. 7a with the arms extended;

FIG. 7c is a perspective view of the tool of FIG. 7a with the arms extended;

FIG. 14b is an end view of the impact driven roller tip of FIG. 14a.

DETAILED DESCRIPTION OF THE PREFERRED EMBODIMENTS

Figure 1B:
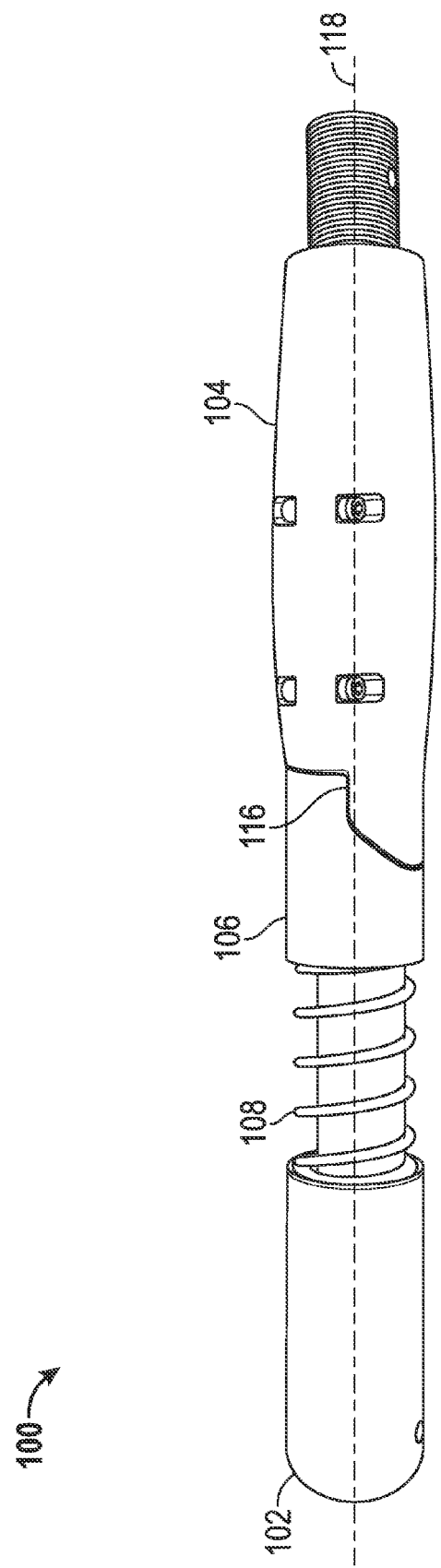
FIG. 1b is a side view of the telebending tool of FIG. 1a in an uncompressed position.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not in function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the temi "couple" or "couples" is intended to mean either an indirect or direct connection. Thus, if a first device couples to a second device, that connection may be through a direct connection, or through an indirect connection via other devices, components, and connections. Further, the terms "proximal" and distal are intended to refer to proximity relative to the surface of the well. Thus, if a first device is distal and a second device is proximal, the second device is nearer to the surface of the well than the first device.

In accordance with various embodiments, a well access telebending tool is provided at the distal end of a logging tool. In some embodiments, the telebending tool includes a nose coupled to a body by a pivoting member. A compression spring between the nose and the pivoting member enables the nose to axially compress relative to or toward the pivoting member in response to an axially-applied force. A camming arm is also coupled to the nose and comprises an end that extends axially through and slidably engages the pivoting member. When the compression spring is compressed, the end of the camming arm engages one or more cam pathways. The cam pathways are oriented at an angle relative to a longitudinal axis of the telebending tool such that when the camming arm engages one of the pathways, the pivoting member and the nose pivot relative to the body. Thus, when the telebending tool encounters an obstruction in a wellbore (e.g., a ridge or ledge), the nose compresses toward the pivoting member in response to the axially-applied force presented by the obstruction, causing the camming arm to engage one or more cam pathways, which in turn causes the nose and the pivoting member to pivot relative to the tool body and avoid or "slide" off the obstruction. The cam pathways may be described as being part of the body (e.g., milled into the body itself) or as part of a cam housing, which may be milled into the body or may be a separate housing coupled to the body. Compressing the nose enables momentum to be conserved when the telebending tool encounters an obstruction, which enables the tool to continue downhole once the nose pivots off of the obstruction.

In accordance with various embodiments, a well access tool is provided at the distal end of a logging tool. In some embodiments, the tool includes a nose coupled to a body and configured to move axially relative to the body upon impact with an obstruction in a borehole. Axial compression and movement of the nose relative to the body actuates a mechanism in the tool that extends a feature radially outward into engagement with the formation to urge the tool away form the formation and/or forward, thereby passing the obstruction.

FIG. 1a shows a telebending tool 100 in accordance with various embodiments. The telebending tool 100 may attach to the distal end of a logging tool or, in some cases, attach to a ballast member to supply additional weight that in turn attaches to the distal end of a logging tool (e.g., by a threaded connection 105). The telebending tool 100 comprises a nose 102 coupled to a body 104 through a pivoting member 106. The nose 102 has a nose end 102a and a tail end 102b. In some embodiments, the nose end 102a is semi-spherical or convex in shape and the tail end 102b is cylindrical. The tail end 102b engages a compression spring 108, situated between the nose 102 and the pivoting member 106, which enables the nose 102 to compress relative to the pivoting member 106 in response to an axially-applied force. The compression spring 108 engages an outer shoulder 106a of the pivoting portion 106. A camming arm 110 is coupled to the nose 102 and extends coaxially through and slidably engages the pivoting member 106. As shown, the compression spring 108 is compressed, which causes the camming arm 110 to extend from the pivoting member 106 and engage a cam pathway 114 within a cam housing 112. The cam housing 112 may be milled from the body 104 as shown or, alternately, may be a separate housing that is coupled to the body 104.

The cam pathway 114 is oriented at an angle relative to a longitudinal axis of the telebending tool 100 such that when the camming arm 110 engages the cam pathway 114, the pivoting member 106 pivots relative to the body 104. In accordance with various embodiments, when the nose end 102a of the telebending tool 100 encounters an obstruction in the wellbore, the nose 102 compresses relative to the pivoting member 106. This compression is enabled by the compression spring 108 and causes the camming arm 110 to engage the cam pathway 114 in the cam housing 112, thereby causing the nose 102 and pivoting member 106 to pivot relative to the body 104. As shown, there are two cam pathways 114, each corresponding to a pivot direction for the nose 102 and pivoting member 106. One skilled in the art appreciates that depending on the orientation of an obstruction encountered in the wellbore, the camming arm 110 will tend to be urged into one pathway or the other, causing the nose 102 and pivoting member 106 to pivot away from the obstruction. One skilled in the art further appreciates that the pivoting motion of the nose 102 in response to encountering an obstruction in the wellbore causes the nose 102 to be deflected away from the obstruction, allowing the telebending tool 100, and a logging tool coupled to the telebending tool 100, to slide off or otherwise continue past the obstruction.

The nose 102 and the pivoting portion 106 share a common central axis 101 and the body 104 has a central axis 103. The nose 102 may be described has having a first or straight position with axes 101, 103 coaxially aligned (FIG. 1b) and a second or pivoted position with axis 101 oriented at an acute angle A relative to the central axis 103 (FIG. 1a). As explained above, compression of the telebending tool 100 transitions the nose 102 from the straight position to the pivoted position.

In accordance with various embodiments, FIG. 1b shows the telebending tool 100 in the straight position, which would be the case when the telebending tool 100 is being lowered into a wellbore and not encountering any obstructions. The axes 101, 103 are coaxially aligned when the telebending tool 100 is in the straight position and are relabeled as axis 118 for clarity. As shown, the compression spring 108 is not compressed and thus the nose 102 and pivoting member 106 are not pivoted with respect to the body 104. Although not shown in FIG. 1b, the camming arm 110 does not engage the cam pathway 114 when the compression spring 108 is not compressed. Additionally, as will be explained in more detail below, a biasing element may be coupled to a hinge 116 between the pivoting member 106 and the body 104 and bias telebending tool 100 to the straight position (i.e., so the nose 102 and pivoting member 106 default to a straight position orientation when the nose 102 is not compressed).

Figure 1C:
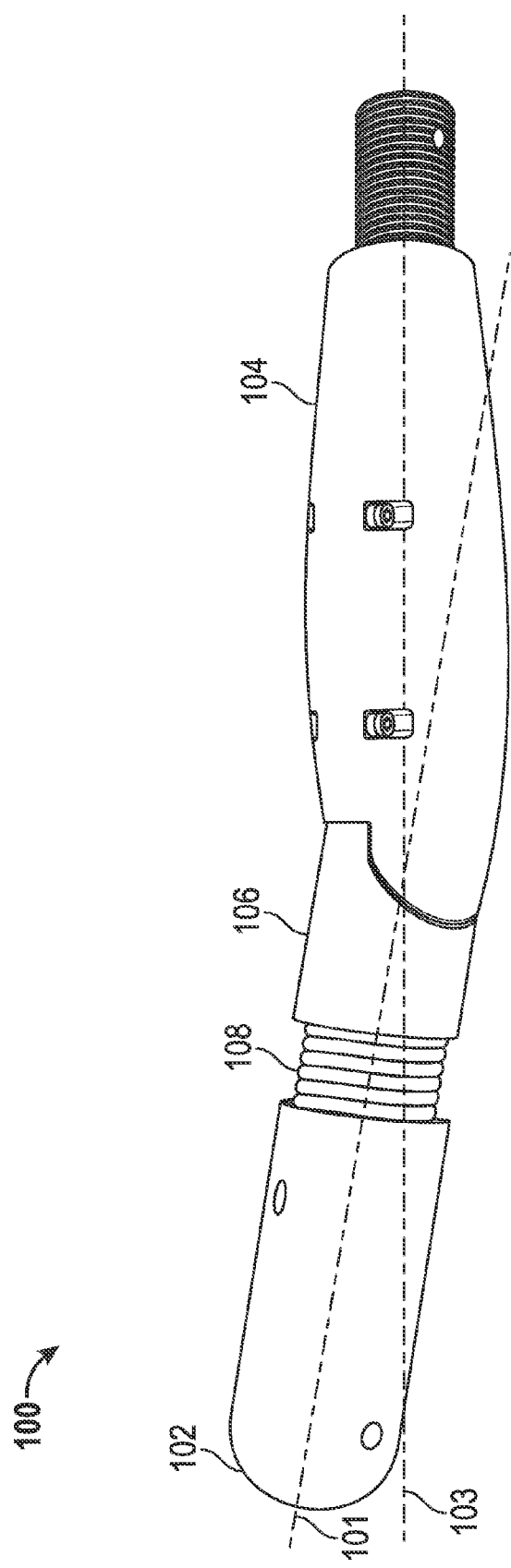
FIG. 1c is a perspective view of the telebending tool of FIG. 1a in a compressed and pivoted position.

In accordance with various embodiments, FIG. 1c shows an exterior view of the telebending tool 100 in the pivoted position with the nose 102 in the compressed position. Nose 102 is urged toward the pivoting member 106, and the compression spring 108 is compressed. As explained above, the nose 102 being compressed relative to the pivoting member 106 causes a camming arm (not shown) coupled to the nose 102 to engage a cam pathway. The nose 102 and pivoting member 106 then pivot relative to the body 104, for example by the amount given by the angle between the axis 101 and the axis 103, because the cam pathway is angled relative to a longitudinal axis of the body 104 (e.g., the axis 103). As above, the pivoting of the nose 102 and pivoting member 106 relative to the body 104 allows the telebending tool 100, and a logging tool coupled to the telebending tool 100, to slide off or otherwise continue past a wellbore obstruction.

Figure 1D:
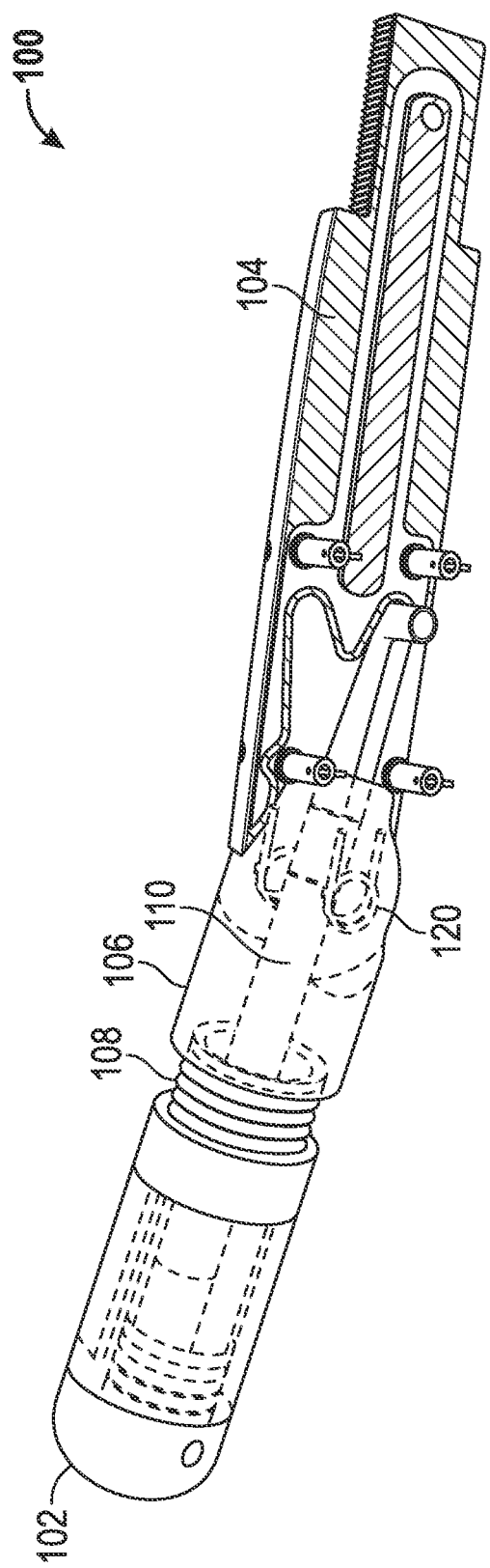

In accordance with various embodiments, FIG. 1d shows a cutaway view of the telebending tool 100 and, in particular, highlights the use of a biasing element 120. As discussed above, it may be desirable to bias the nose 102 and pivoting member 106 to the straight position relative to the body 104 (i.e., where the axis 101 and the second axis 103 are coaxially aligned) when the compression spring 108 is not compressed. This is, for example, useful to maintain a streamlined form factor when the telebending tool 100 is being lowered downhole unobstructed. One skilled in the art appreciates that the biasing element 120 may be coupled to the body 104 and may oppose off-center motion of the pivoting member 106 relative to the body 104.

Figure 1E:
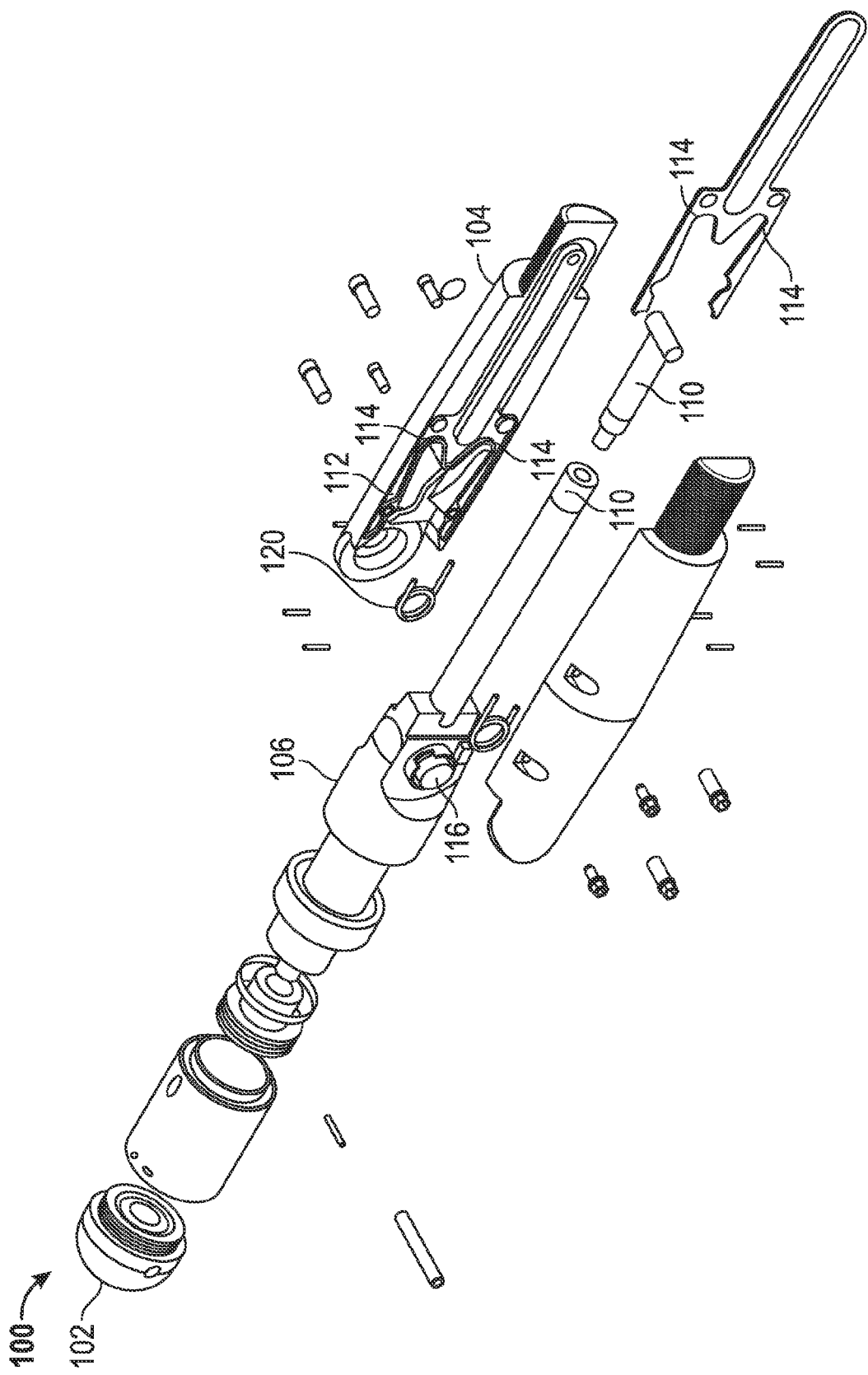

FIG. 1e shows an exploded view of the telebending tool 100 in accordance with various embodiments. The hinge 116 between the pivoting member 106 and the body 104 is more clearly illustrated, as is the biasing element 120 between the pivoting member 106 and the body 104. Additionally, the camming arm 110 is shown extending coaxially through and slidably engaging the pivoting member 106 and the cam pathways 114 and cam housing 112 are milled into the body 114. Although not shown in this exploded view, one skilled in the art appreciates that the camming arm 110 couples to the nose 102.

Figure 2A:
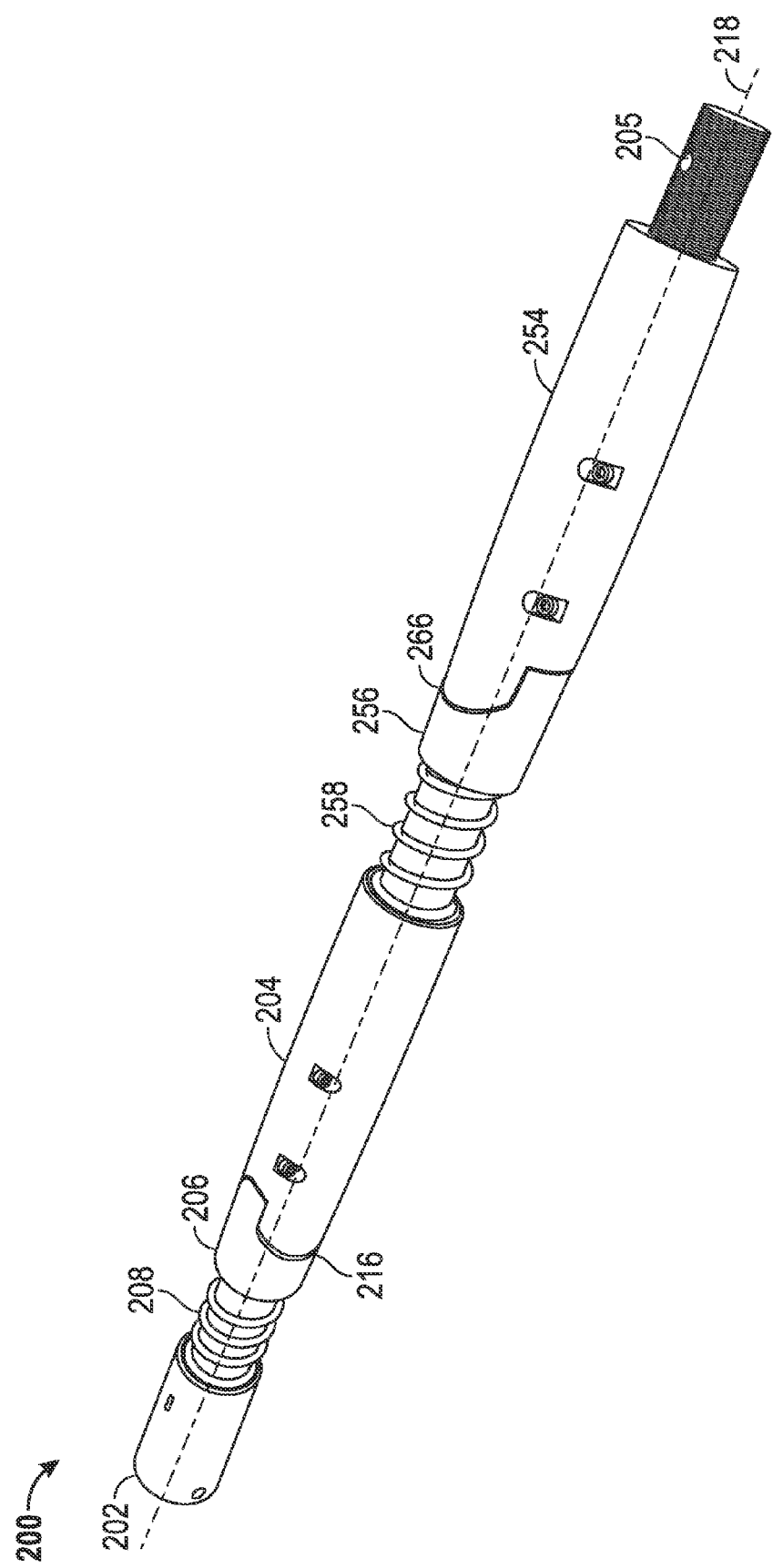
FIG. 2a is a perspective view of an embodiment of a dual-stage telebending tool in accordance with the principles described herein.

FIG. 2a shows a dual-stage telebending tool 200 in accordance with various embodiments. Similar to the telebending tool 100, the dual-stage telebending tool 200 may attach to the distal end of a logging tool or, in some cases, attach to a ballast member that in turn attaches to the distal end of a logging tool (e.g., by a threaded connection 205). The dual-stage telebending tool 200 is similar in operation to the telebending tool 100 but adds an additional pivoting feature, enabling a broader range of movement in response to encountering an obstruction in the wellbore. This provides the dual-stage telebending tool 200 with a more robust ability to avoid obstructions in the wellbore. The dual-stage telebending tool 200 comprises a nose 202 coupled to a body 204 through a pivoting member 206 (collectively a "stage" or "first stage"). The nose 202 has a nose end 202a and a tail end 202b. In some embodiments, the nose end 202a is semi-spherical or convex in shape and the tail end 202b is cylindrical. The tail end 202b engages a compression spring 208, situated between the nose 202 and the pivoting member 206, which enables the nose 202 to compress relative to the pivoting member 206 in response to an axially-applied force. Similar to the nose 202 coupling to the body 204, the body 204 couples to a second body 254 through a second pivoting member 256 (collectively a "stage" or "second stage"). The body 204 also comprises a cylindrical portion 204a that engages a second compression spring 258, situated between the body 204 and the second pivoting member 256, which enables the body 204 to compress relative to the second pivoting member 206 in response to an axially applied force.

In some embodiments, the spring constants of compression springs 208, 258 are selected such that when an axial force is applied to the dual-stage telebending tool 200, one compression spring compresses before the other (i.e., the spring constants are not equal). However, in alternate embodiments, the spring constants of compression springs 208, 258 are selected such that when an axial force is applied to the dual-stage telebending tool 200, both compression springs compress at the same time (i.e., the spring constants are equal). Additionally, in some embodiments the pivoting members 206, 256 may be arranged such that the pivoting motions of each are in different planes (e.g., 90 degrees apart). This enables a broader range of motion, allowing the dual-stage telebending tool 200 to more effectively slide off or otherwise continue past a wellbore obstruction. Alternately, both pivoting members 206, 256 may be arranged such that the pivoting motions of each are in the same plane, enabling a greater degree of pivoting in that direction.

FIG. 2a shows the dual-stage telebending tool 200 in a straight position (i.e., where the axis of each stage are coaxially aligned, shown by axis 218), which would be the case when the dual-stage telebending tool 200 is being lowered into a wellbore and not encountering any obstructions. Further, each stage of the dual-stage telebending tool 200 is in the uncompressed position. As shown, neither compression spring 208, 258 is compressed and thus the nose 202 and the pivoting member 206 are not pivoted with respect to the body 204. Further, the body 204 and the second pivoting member 256 are not pivoted with respect to the second body 254. Although not shown in FIG. 2a, and as will be explained in more detail below, a biasing element may be included in hinges 216, 266 between the pivoting member 206 and the body 204 and between the second pivoting member 256 and the second body 254, respectively, to bias telebending tool 200 to the straight position shown in FIG. 2a.

Figure 2B:
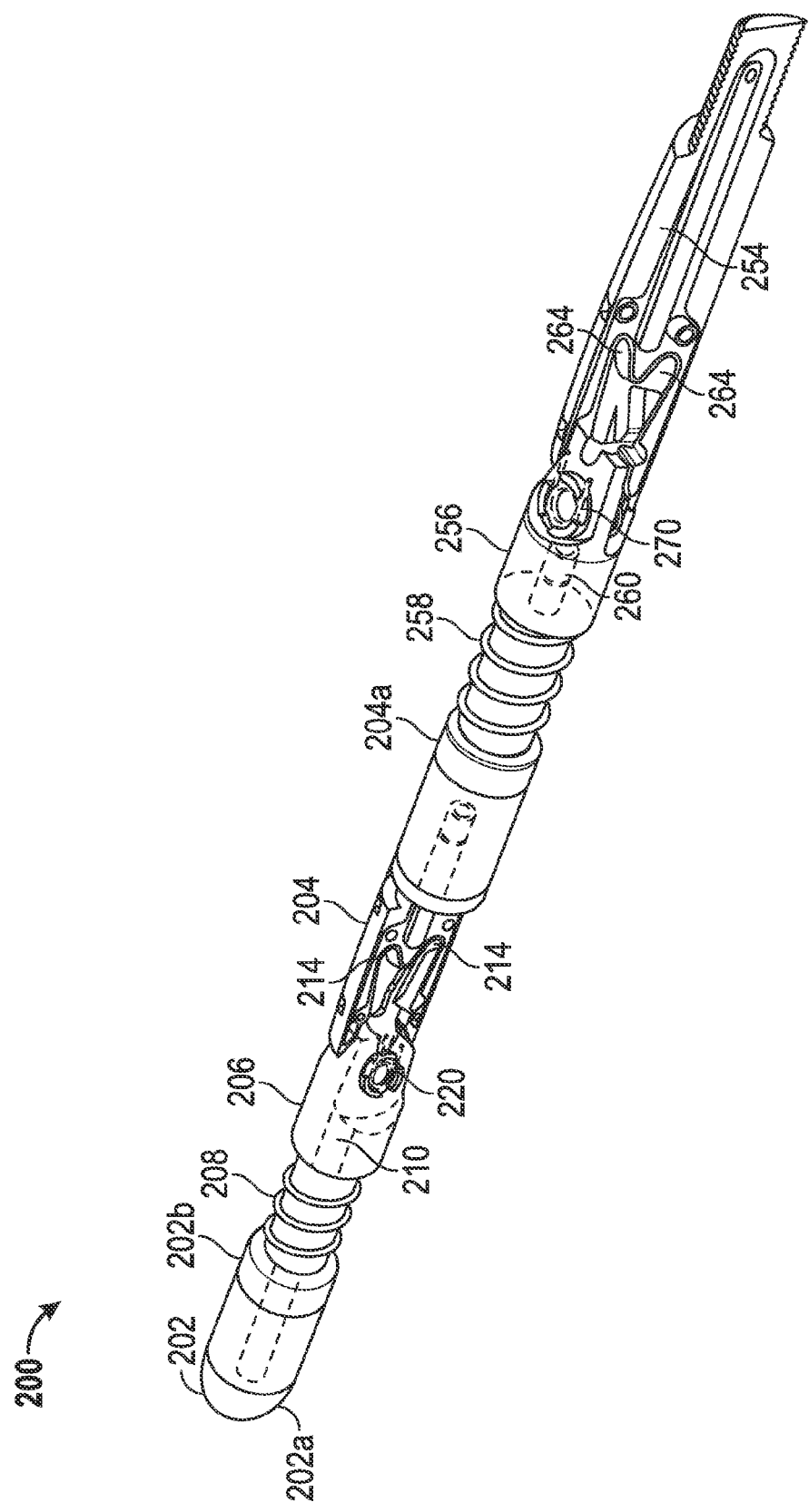

In accordance with various embodiments, FIG. 2b shows a cutaway view of dual-stage telebending tool 200. Similar to FIGS. 1a-e, camming arm 210 is coupled to the nose 202 and extends coaxially through and slidably engages the pivoting member 206. As shown, the compression spring 208 is uncompressed and thus the camming arm 210 does not engage a cam pathway 214. The dual-stage telebending tool 200 comprises a second camming arm 260 that is coupled to the body 204 and extends coaxially through and slidably engages the second pivoting member 256. Again, the compression spring 258 is uncompressed and thus the camming arm 260 does not engage a cam pathway 264.

The cam pathways 214, 264 are oriented at an angle relative to the longitudinal axis of the dual-stage telebending tool 200 (e.g., axis 218 of FIG. 2a) such that when the camming arm 210, 260 engages the cam pathway 214, 264, the pivoting member 206, 256 pivots relative to the body 204 and the second body 254, respectively. In accordance with various embodiments, when the nose end 202a of the dual-stage telebending tool 200 encounters an obstruction in the wellbore, the nose 202 compresses relative to the pivoting member 206. This compression is enabled by the compression spring 208 and causes the camming arm 210 to engage the cam pathway 214, thereby causing the nose 202 and pivoting member 206 to pivot relative to the body 204. Additionally, the body 204 may compress relative to the second pivoting member 256. This compression is enabled by the compression spring 258 and, depending on the spring constants of the compression springs 208, 258, may occur serially or in parallel with the compression of the compression spring 208. The compression of compression spring 258 causes the camming arm 260 to engage the cam pathway 264, thereby causing the body 204 and the pivoting member 256 to pivot relative to the second body 254.

As shown, there are two cam pathways 214 and 264, each corresponding to a pivot direction for the nose 202 and pivoting member 206, and the body 204 and pivoting member 256, respectively. One skilled in the art appreciates that depending on the orientation of an obstruction encountered in the wellbore, the camming arm 210, 260 will tend to be urged into one pathway or the other, causing the nose 202 and pivoting member 206, and the body 204 and second pivoting member 256, to pivot away from the obstruction. One skilled in the art further appreciates that the pivoting motion of the nose 202 in response to encountering an obstruction in the wellbore causes the nose 202 to be deflected away from the obstruction, allowing the dual-stage telebending tool 200, and a logging tool coupled to the dual-stage telebending tool 200, to slide off or otherwise continue past the obstruction. As explained above, the pivoting motion of each "stage" may be in the same plane, thereby allowing a greater pivoting angle in that plane. Alternately, the pivoting motion of each stage may be in different planes (e.g., 90 degrees apart), thereby enabling a broader range of motion, allowing the dual-stage telebending tool 200 to more effectively slide off or otherwise continue past a wellbore obstruction. Further, the nose 202 moving into the compressed position causes the first stage to be in the pivoted position and the body 204 moving into the compressed position causes the second stage to be in the pivoted position.

FIG. 2b also illustrates the use of biasing elements 220, 270 in each stage. As discussed above, it may be desirable to bias the nose 202 and pivoting member 206 to a straight position relative to the body 204 and to bias the body 204 and the second pivoting member 256 to a straight position relative to the second body 254, when the compression springs 208, 258 are not compressed. In other words, each stage of the dual-stage telebending tool 200 is biased to a coaxially aligned position. This is, for example, useful to maintain a streamlined form factor when the dual-stage telebending tool 200 is being lowered downhole unobstructed. One skilled in the art appreciates that the biasing elements 220, 270 may be coupled to the body 204 and the second body 254, respectively, and may oppose off-center motion of the pivoting members 206, 256 relative to the body 104 and the second body 254, respectively.

Figure 3A:
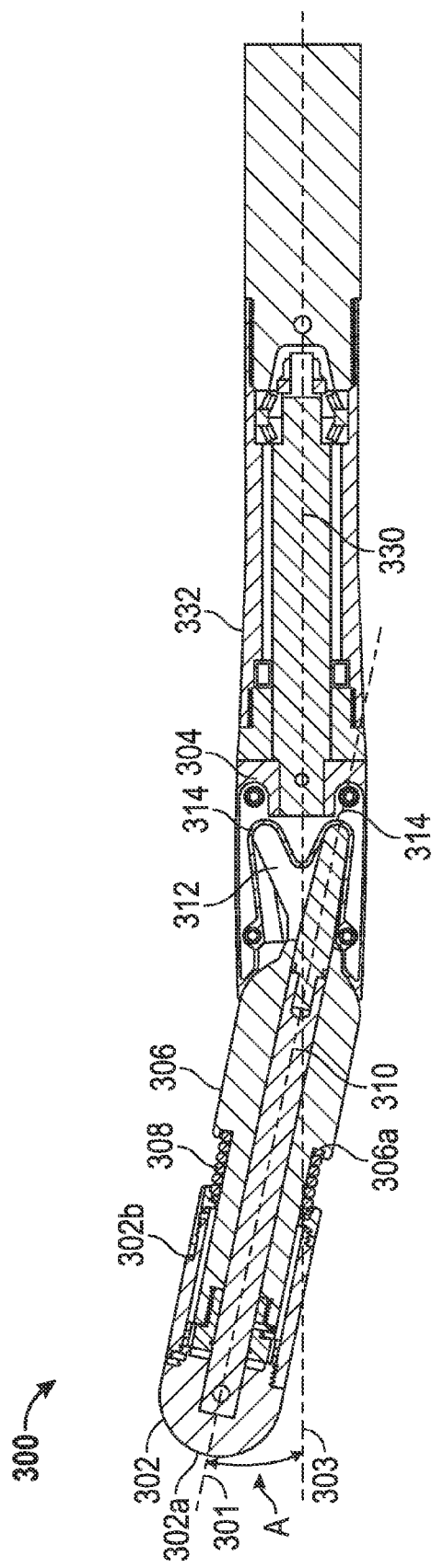
FIG. 3a is a cross-sectional view of an embodiment of a swivel telebending tool in accordance with the principles described herein.

FIG. 3a shows a swivel telebending tool 300 in accordance with various embodiments. The swivel telebending tool 300 may attach to the distal end of a logging tool or, in some cases, attach to a ballast member that in turn attaches to the distal end of a logging tool (e.g., by a threaded connection). The swivel telebending tool 300 comprises a nose 302 coupled to a body 304 through a pivoting member 306. The nose 302 has a nose end 302a and a tail end 302b. In some embodiments, the nose end 302a is semi-spherical or convex in shape and the tail end 302b is cylindrical. The tail end 302b engages a compression spring 308, situated between the nose 302 and the pivoting member 306, which enables the nose 302 to compress relative to the pivoting member 306 in response to an axially-applied force. The compression spring 308 may engage an outer shoulder 306a of the pivoting portion 306. A camming arm 310 is coupled to the nose 302 and extends coaxially through and slidably engages the pivoting member 306. As shown, the compression spring 308 is compressed, which causes the camming arm 310 to extend from the pivoting member 306 and engage a cam pathway 314 of a cam housing 312. The cam housing 312 may be milled from the body 304 as shown or, alternately, may be a separate housing that is coupled to the body 304.

The cam pathway 314 is oriented at an angle relative to a longitudinal axis of the swivel telebending tool 300 such that when the camming arm 310 engages the cam pathway 314, the pivoting member 306 pivots relative to the body 304. The swivel telebending tool 300 further comprises a swivel arm 330 coupled to the body 304. The swivel arm 330 passes through a swivel housing 332 and is able to rotate freely inside the swivel housing 332. Thus, the body 304 is able to rotate about an axis, defined by the swivel arm 330, relative to the swivel housing 332. As a result, the nose 302 and the pivoting member 306 may be oriented in any radial direction despite only being able to, for example, pivot from side to side (i.e., in one plane). This broader range of motion compared to, for example, the telebending tool 100, enables the swivel telebending tool 300 to more effectively slide off or otherwise continue past a wellbore obstruction.

The nose 302 and the pivoting portion 306 share a common central axis 301 and the body 304 has a central axis 303. The nose 302 may be described as having a first or straight position with axes 301, 303 coaxially aligned and a second or pivoted position (FIG. 3a) with the axis 301 oriented at an acute angle A relative to the axis 303. As explained above, compression of telebending tool 300 transitions the nose 302 from the straight position to the pivoted position.

In accordance with various embodiments, when the nose 302 of the telebending tool 300 encounters an obstruction in the wellbore, the nose 302 compresses relative to the pivoting member 306. This compression is enabled by the compression spring 308 and causes the camming arm 310 to engage the cam pathway 314 in the cam housing 312, thereby causing the nose 302 and pivoting member 306 to pivot relative to the body 304, for example by the amount given by the angle between the axis 301 and the second axis 303. As shown, there are two cam pathways 314, each corresponding to a pivot direction for the nose 302 and pivoting member 306. One skilled in the art appreciates that depending on the orientation of an obstruction encountered in the wellbore, the camming arm 310 will tend to be urged into one pathway or the other, causing the nose 302 and pivoting member 306 to pivot away from the obstruction. Additionally, as explained above, the body 304 may rotate relative to the swivel housing 332 such that the nose 302 and pivoting member 306 may both pivot and rotate away from the obstruction. One skilled in the art further appreciates that the pivoting and rotating motion of the nose 302 in response to encountering an obstruction in the wellbore causes the nose 302 to be deflected away from the obstruction, allowing the swivel telebending tool 300, and a logging tool coupled to the swivel telebending tool 300, to slide off or otherwise continue past the obstruction.

Figure 3B:
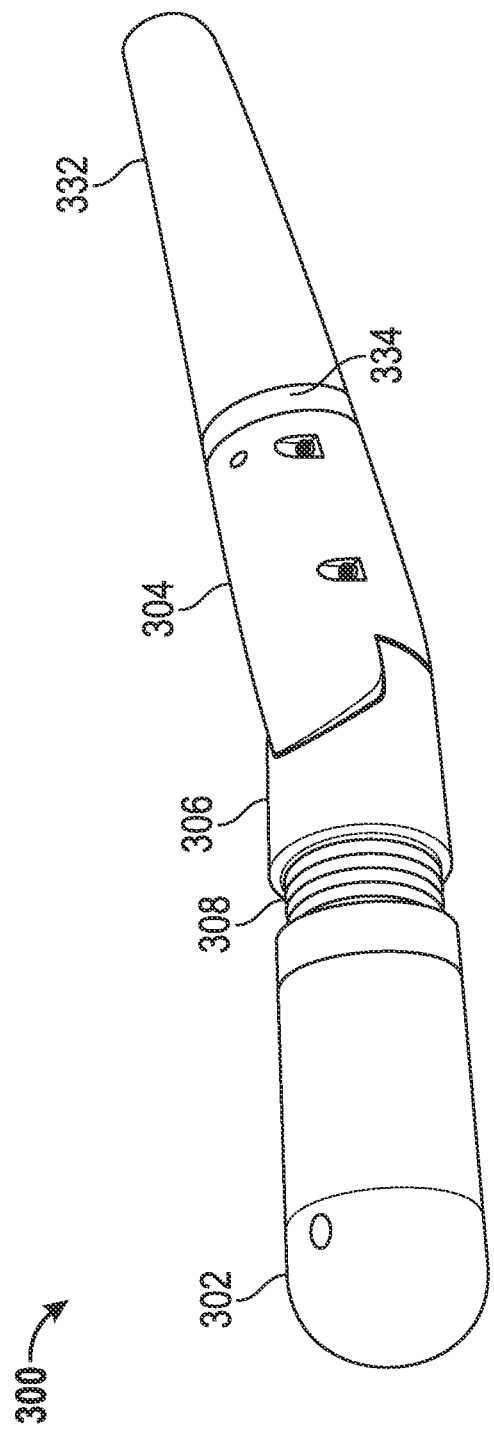
FIG. 3b is a perspective view of the telebending tool of FIG. 3a in a compressed and pivoted position.

FIG. 3b shows an external view of a swivel telebending tool 300 in accordance with various embodiments. In some embodiments, a low-friction buffer 334 may be situated between the body 304 and the swivel housing 332 to facilitate rotation of the body 304 relative to the swivel housing 332. The various other elements numbered as in FIG. 3a share the functions as described above with respect to FIG. 3a.

Figure 4A:
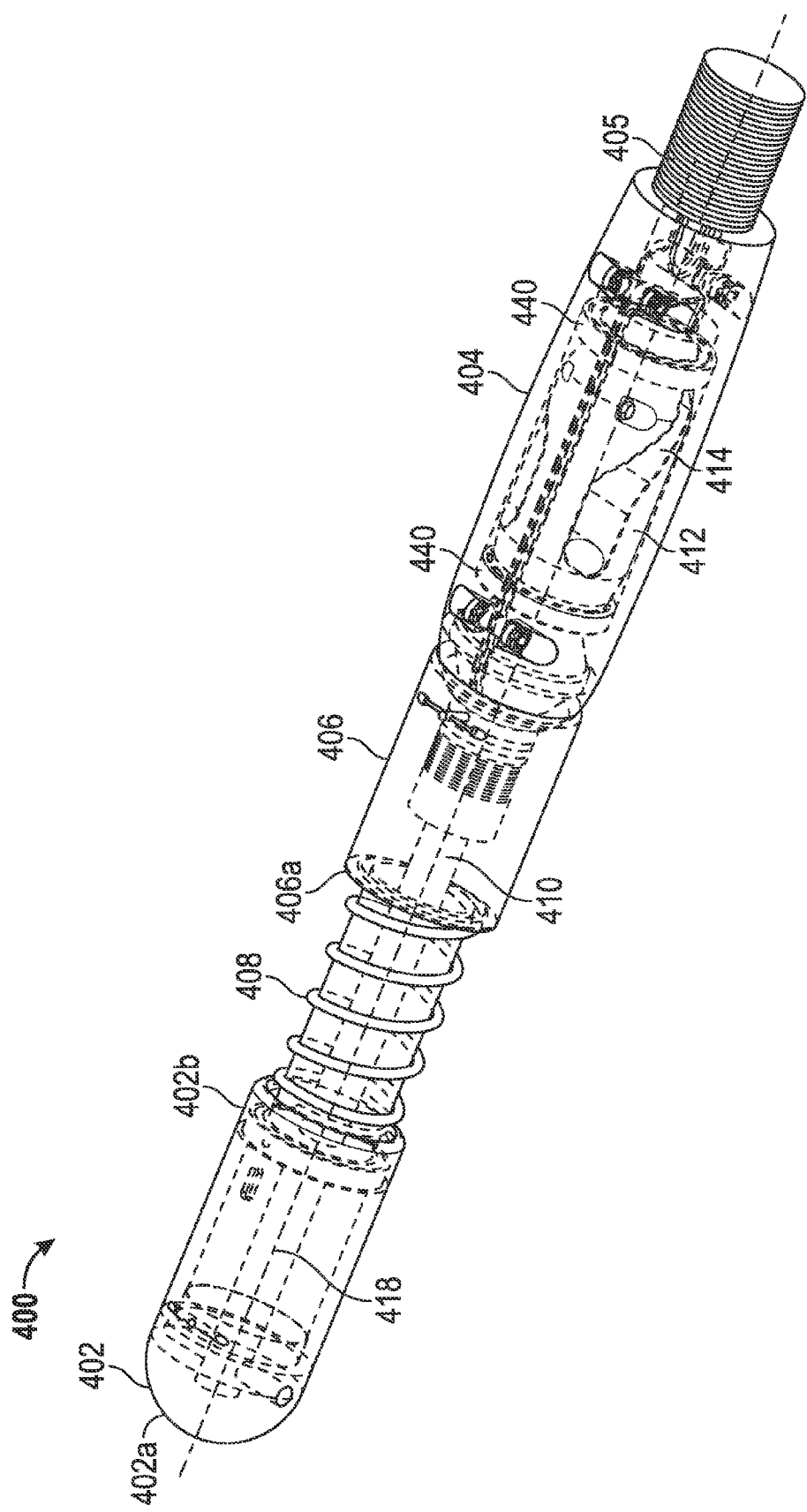
FIG. 4a is a transparent view of an embodiment of a self-orienting telebending tool in accordance with the principles described herein.
Figure 4B:
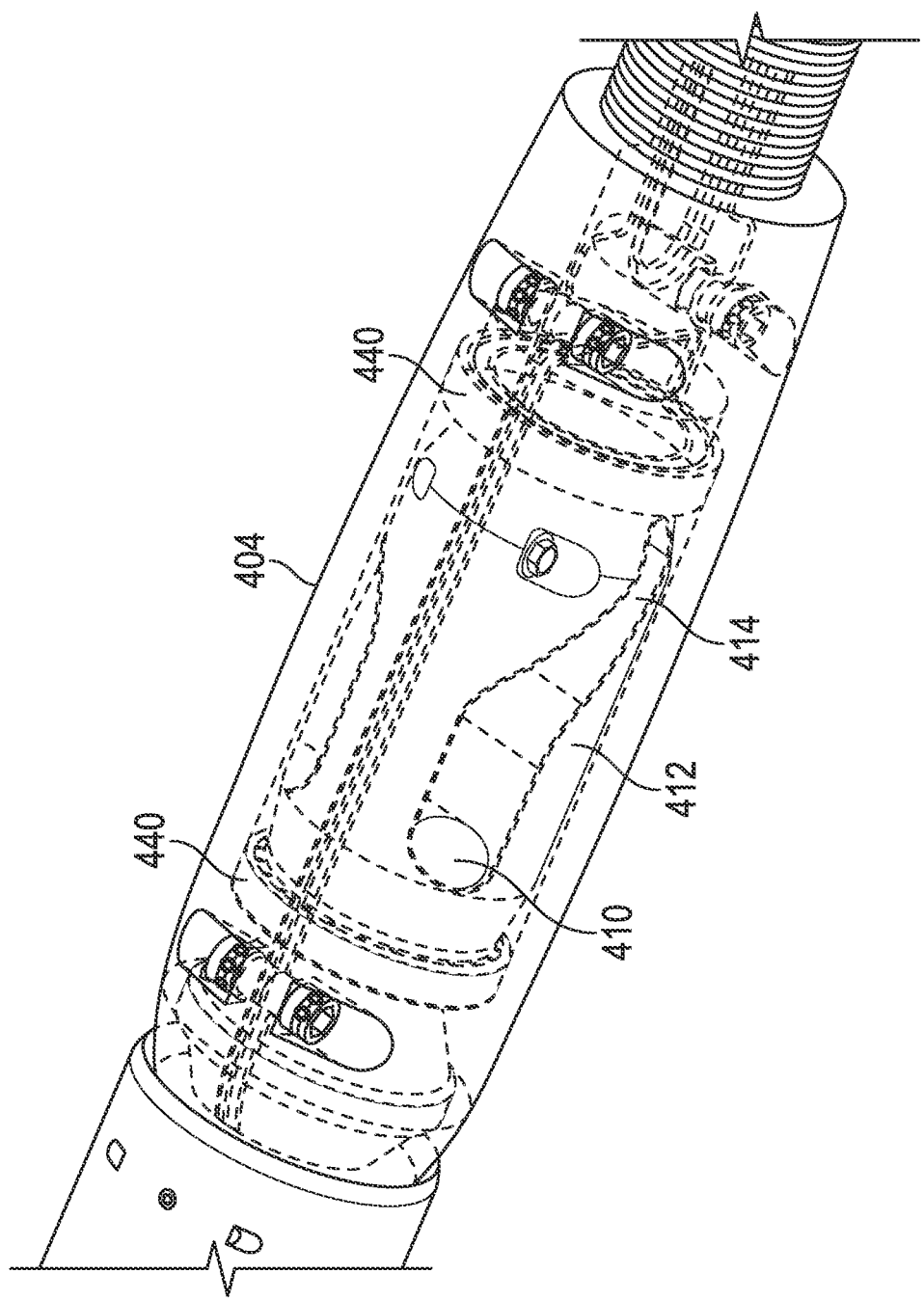

FIG. 4a shows a self-orienting telebending tool 400 in accordance with various embodiments. The self-orienting telebending tool 400 may attach to the distal end of a logging tool or, in some cases, attach to a ballast member that in turn attaches to the distal end of a logging tool (e.g., by a threaded connection 405). The self-orienting telebending tool 400 comprises a nose 402 coupled to a body 404 through a self-orienting portion 406. The nose 402 has a nose end 402a and a tail end 402b. In some embodiments, the nose end 402a is semi-spherical or convex in shape and the tail end 402b is cylindrical. The tail end 402b engages a compression spring 408, situated between the nose 402 and the self-orienting portion 406, which enables the nose 402 to compress relative to the self-orienting portion 406 in response to an axially-applied force. The compression spring 408 engages an outer shoulder 406a of the pivoting portion 406. A camming arm 410 is coupled to the nose 402 and extends coaxially through and slidably engages the self-orienting portion 406. As shown, the cam housing 412 comprises a separate housing inside of the body 304. Additionally, the cam housing 412 is mounted on roller bearings 440, enabling the cam housing 412 to rotate relative to the body 404. FIG. 4b shows an expanded view of the interface between the cam housing 412 and the body 404.

The ability of the cam housing 412 to rotate relative to the body 404 in addition to the cam pathway 414 being oriented at an angle relative to a longitudinal axis 418 of the self-orienting telebending tool 400 enables the self-orienting portion 406, and thus the nose 402, to deflect from a longitudinal axis 418 of the body 404 in any radial direction when the camming arm 410 engages the cam pathway 414. As a result, the nose 402 and the self-orienting portion 406 may be oriented in any radial direction. This broader range of motion compared to, for example, the telebending tool 100, enables the self-orienting telebending tool 400 to more effectively slide off or otherwise continue past a wellbore obstruction.

In accordance with various embodiments, when the nose 402 of the self-orienting telebending tool 400 encounters an obstruction in the wellbore, the nose 402 compresses relative to the self-orienting portion 406. This compression is enabled by the compression spring 408 and causes the camming arm 410 to engage the cam pathway 414 in the cam housing 412, thereby causing the nose 402 and self-orienting portion 406 to deflect from a longitudinal axis (e.g., longitudinal axis 418) of the body 404. One skilled in the art appreciates that depending on the orientation of an obstruction encountered in the wellbore, the camming arm 410 engages the cam pathway 414 and induces a rotation of the cam housing 412 relative to the body 404, causing the nose 402 and self-orienting portion 406 to deflect away from the obstruction. Thus, in accordance with various embodiments, the self-orienting telebending tool 400, and a logging tool coupled to the self-orienting telebending tool 400, slides off or otherwise continues past the obstruction.

Figure 4C:
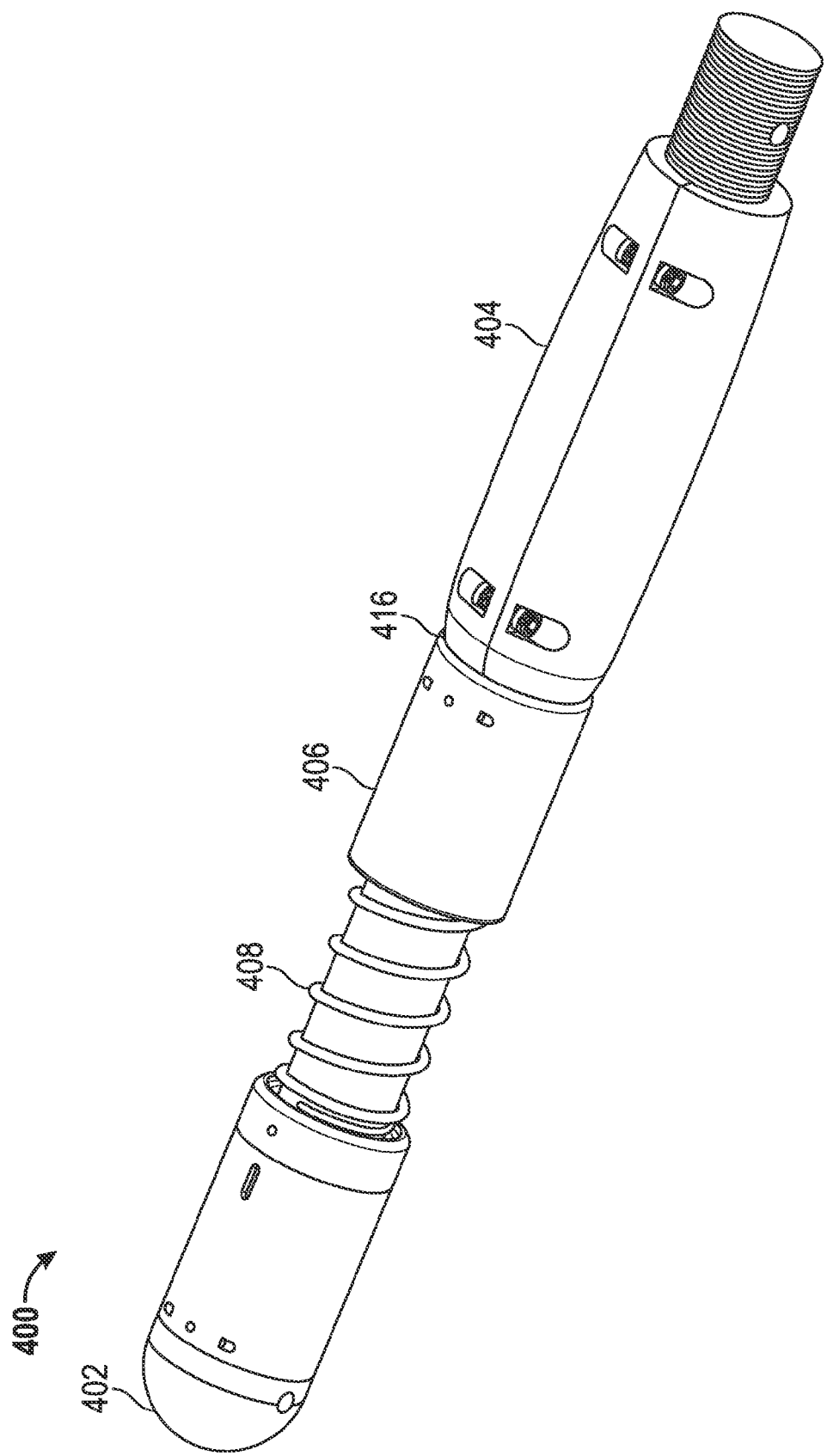

In accordance with various embodiments, FIG. 4c shows the self-orienting telebending tool 400 in an uncompressed position, which would be the case when the self-orienting telebending tool 400 is being lowered into a wellbore and not encountering any obstructions. As shown, the compression spring 408 is not compressed and thus the nose 402 and self-orienting portion 406 are coaxially aligned with respect to the body 104. As shown in FIG. 4a, the camming arm 410 engages the cam pathway 414 when the compression spring 408 is not compressed, although the camming arm 410 engages a portion of the cam pathway 414 that does not cause the nose 402 and self-orienting portion 406 to deflect from the longitudinal axis 418. Additionally, rather than a hinge between the self-orienting portion 406 and the body 408, a ball-and-socket coupling 416 enables the self-orienting portion 406 to deflect in any radial direction relative to the body 404. One skilled in the art appreciates that other rotational-type couplings may be similarly employed in lieu of the ball-and-socket coupling 416. Although not shown, a biasing element between the self-orienting portion 406 and the body 404 may cause the self-orienting portion 406 to be coaxially aligned with respect to the body 404 (i.e., so the nose 402 and self-orienting portion 406 default to a straight position when not compressed). The various other elements numbered as in FIG. 4a share the functions as described above with respect to FIG. 4a.

In the embodiments described above, axial compression and movement of the nose relative to the body of the tool upon impact with an obstruction along the borehole actuates the tool to bend (i.e., cause the nose and the pivoting member to pivot relative to the tool body), thereby allowing the tool to avoid or slide off the obstruction. However, as will be described in more detail below, the axial compression and movement of the nose of a tool relative to the tool body may also be used to actuate a variety of different mechanisms in the tool that facilitate guidance of the tool around obstructions in the borehole. For example, the figures associated with the below-described examples illustrate embodiments of downhole tools that utilize the axial compression and movement of the tool tip or nose relative to the tool body resulting from an impact with an obstruction in the borehole to articulate onboard "break-free" mechanisms.

FIGS. 5a-5d illustrate a downhole tool 500 that utilizes the axial movement of the tool tip or nose 502 relative to the tool body 504 resulting from an impact with an obstruction in the borehole to articulate vibrating arms 506. The vibrating arms concept relies on the introduction of vibrations to an immobilized downhole tool to shake it, thereby preventing the tool 500 from resting on the ground and resulting in overcoming the obstacle. The nose 502 may be biased (e.g., using a spring) such that when not in contact with an obstacle, the nose is in an extended position.

Figure 5A:
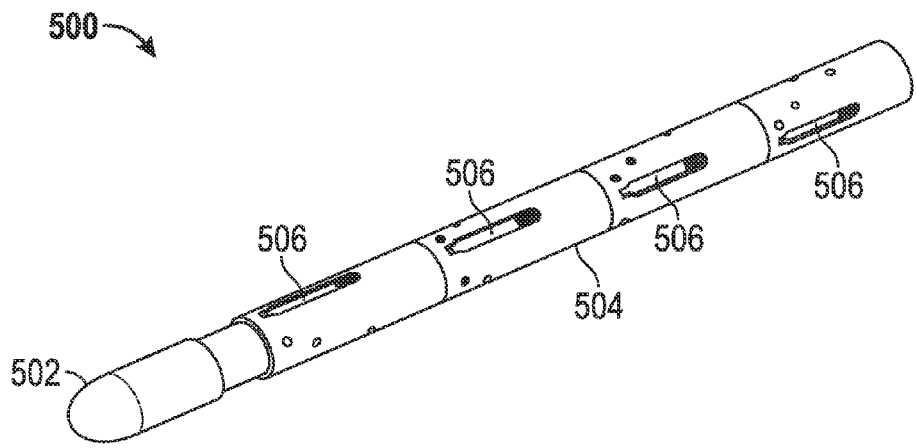
FIG. 5a is a perspective view of an embodiment of a downhole tool in accordance with the principles described herein including vibrating break-free mechanisms.
Figure 5B:
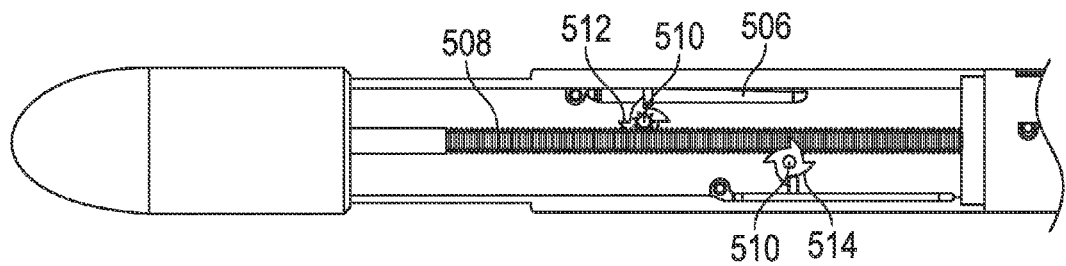

There are many different means to vibrate a downhole tool. The downhole tool 500 shown in FIGS. 5a-5d uses several small arms 506 arranged along and around the tool body 504. The position and/or location of these arms 506 in addition their length and travel distance may be varied based on the required application. When the tool 500 hits an obstacle, the nose tip 502 of the tool 500 begins to retract in a telescopic motion. As shown in FIGS. 5b and 5c, a rack 508 attached to the moving nose 502 moves linearly inside the tool body 504. One or more fixed shafts 510 placed perpendicular to the longitudinal axis of the tool body 504 have integrated pinion gears 512, which are driven by the rack 508, thus rotating the shafts 510. Each shaft 510 has a specially designed cam 514 according to the specific application requirements, which rotates with the shafts 510 thus driving the vibrating arms 506. In particular, the linear motion of the rack 508 causes the rotation of the pinions 512 and cams 514 and the cams 512 push the followers and rotate the arms 506 outward relative to the tool body 504.

In this embodiment, the rack 508 is designed with round teeth to allow the positioning of the pinions 512 at any angle around it, as shown in FIG. 5d. This adds flexibility to the design where the arms 506 can be arranged in many combinations around the circumference of the tool body 504. In some embodiments, the cam profile 514 is designed to raise the arm 506 smoothly; then, after the arm 506 reaches the maximum travel, the arm 506 drops back inside the tool body 504. With several arms 506 performing the rise-drop motion consecutively and/or sequentially according to the pinion gear 512 and cam profile 514 arrangement, the tool 500 shakes, thereby offering the potential to overcome an obstacle. In accordance with various embodiments, such a design may be integrated in an existing tool body or as a standalone module to avoid obstacles in a wellbore.

Figure 6B:
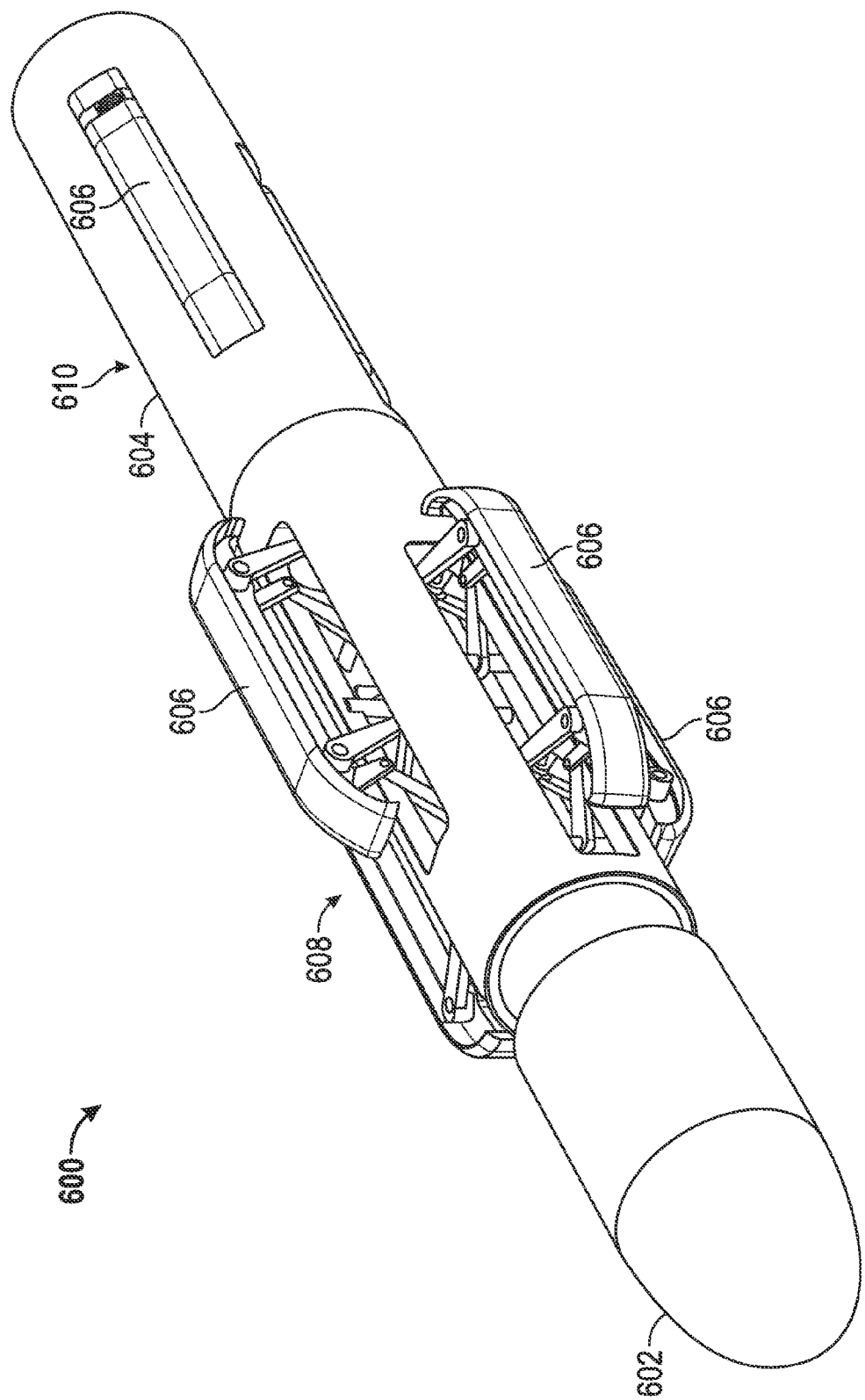
FIG. 6b is a perspective view of the tool of FIG. 6a with the glides radially extended.
Figure 6C:
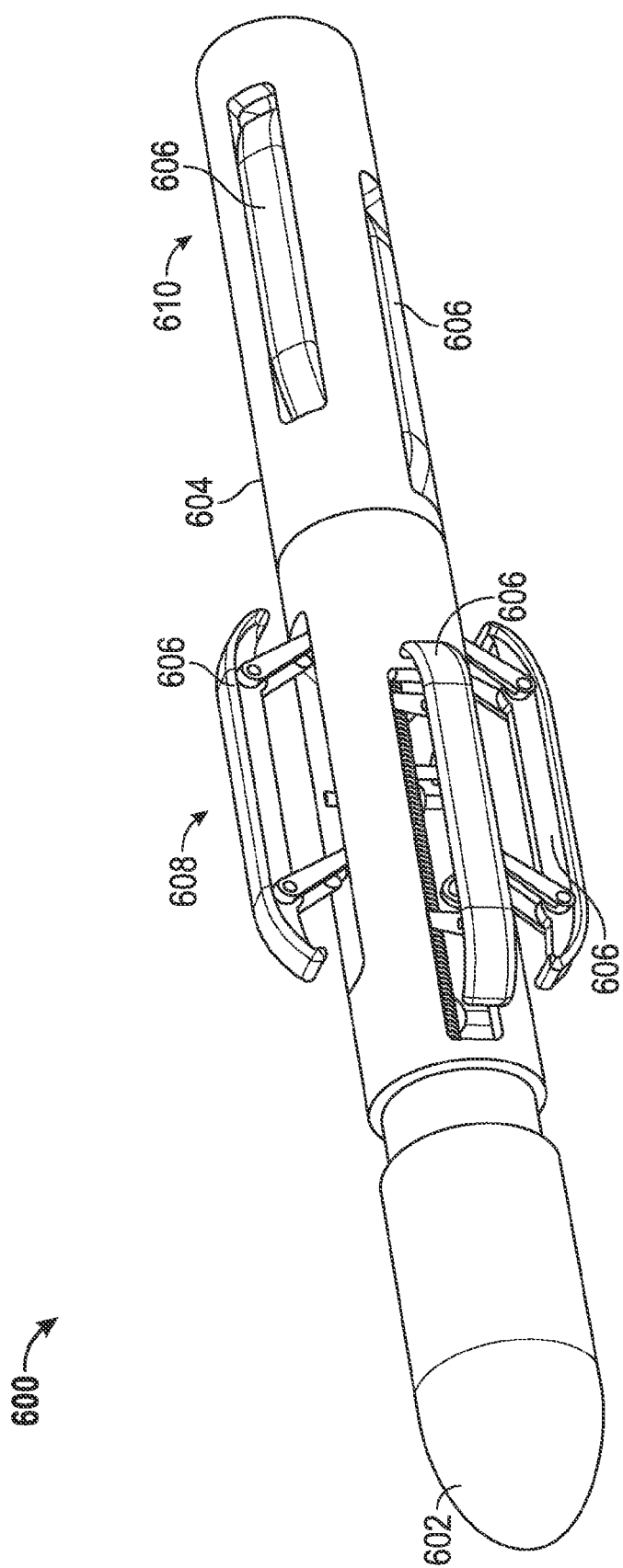
FIG. 6c is a perspective view of the tool of FIG. 6a with the glides radially extended.

FIGS. 6a-6e illustrate a downhole tool 600 that utilizes the axial movement of the tool tip or nose 602 relative to the tool body 604 resulting from an impact with an obstruction in the borehole to articulate and radially extend skis or glides 606 to facilitate movement of the tool 600 around obstacles in the borehole. In the embodiment depicted, for example in FIG. 6b, two sets 608, 610 of axially spaced skis 606 each include four circumferentially-spaced skis 606. In FIG. 6a, all of the skis 606 are retracted while in FIGS. 6b and 6c, the four front skis 606 of set 608 are fully extended, while the four rear skis 606 of set 610 are retracted. The nose 602 may be biased (e.g., using a spring) such that when not in contact with an obstacle, the nose 602 is in an extended position.

Figure 6D:
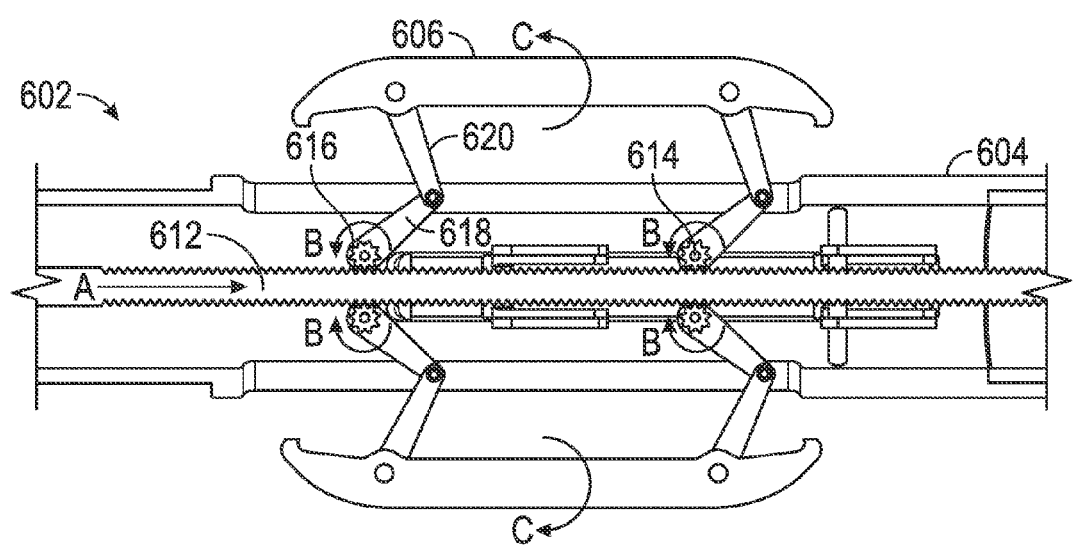
FIG. 6d is a side partial cross-sectional view of the tool of FIG. 6a illustrating the actuation of the glides.

Referring now to FIG. 6d, where certain repeated elements are labeled once for simplicity, the skis 606 are actuated by a rack 612 attached to the tool tip 602, which moves axially along with the tool tip 602. For each ski or glider 606, two shafts 614 that are placed perpendicular to the longitudinal axis of the rack 612 are rotatably coupled to the tool body 604. Each shaft 614 has a pinion gear 616 and a pivoted link 618 attached to it. Each of the pivoted links 618 are pinned to another link 620 attached to the ski 606 and, in some embodiments, the two attached links 618, 620 are pivoted and spring loaded.

The motion sequence of the components, depicted by letters A-C, starts with the rack 612 moving linearly due to an impact on the tool tip 602 (A), for example with an obstacle in the borehole. The axial motion of the rack 612 causes the rotation of the pinions 616 (B), thereby rotating the attached pivoting links 618, 620 and pushing corresponding gliders 606 radially outward relative to the body 604 (C). In embodiments where the tool tip 602 employs a spring return mechanism (not explicitly shown), upon the extension of the tool tip 602 back to its initial or extended position, the rack 612 will cause the gliders 606 to retract radially inward and return to their initial position inside the tool body 604.

In some cases, a solid element that protrudes from the tool body may cause the tool 600 to stop because of the changing cross-section of open holes. However, in accordance with various embodiments, the gliders 606 are coupled to the rotating arms 618 via another set of links 620 and a spring is attached between each rotating link (e.g., on shaft connecting the links) and a control arm thus creating a swing arm suspension system for the gliders 606. Such a system adds flexibility to the design by enabling the gliders 606 to retract, at least partially, in response to contact with a decreasing-radius section of the borehole. In some examples, the system may employ torsion, helical compression or leaf springs.

Figure 6E:
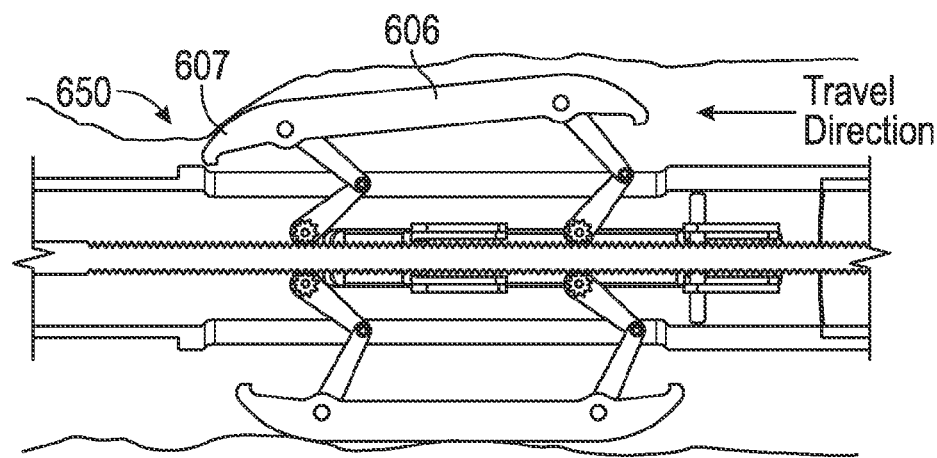
FIG. 6e illustrates sequential cross-sectional views of the tool of FIG. 6a moving around an obstruction in a borehole.
Figure 6E:
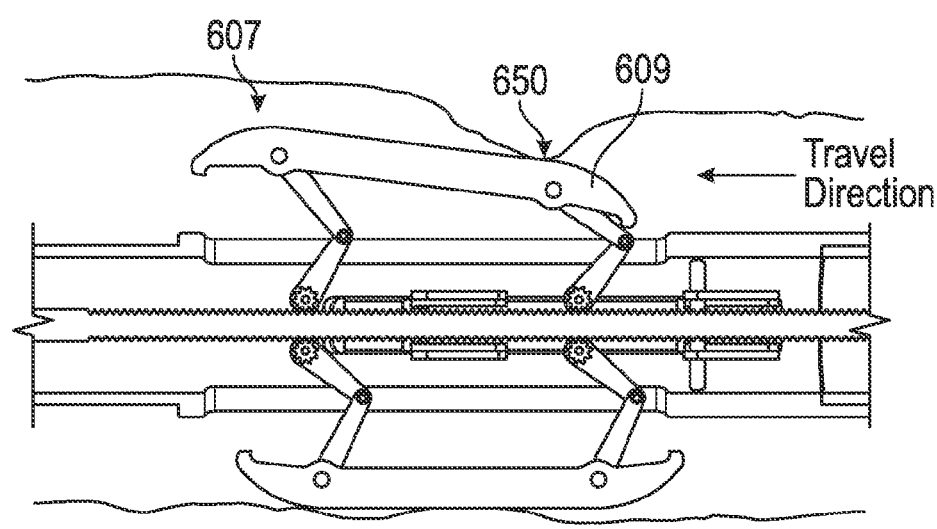
Figure 6E:
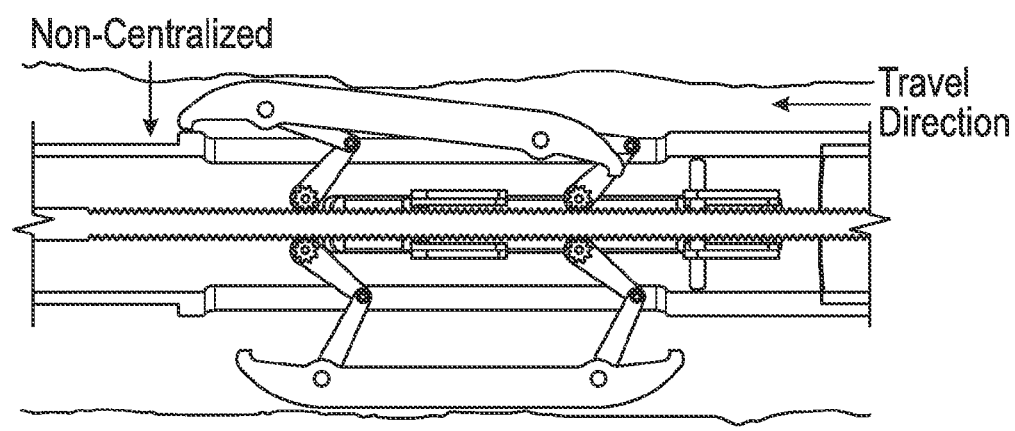

FIG. 6e shows the effect of the aforementioned suspension system in further detail. First, the glider 606 hits a leading ledge of an obstruction 650 and the front edge 607 of the glider 606 is compressed down and slides underneath the ledge (A). Next, the back edge 609 of the glider 606 is compressed by the ledge 650 while the front end 607 of the glider 606 breaks free (B). In some cases, the glider 606 is not parallel to the ground anymore such that the tool is in a non-centralized position (C) with the certain gliders compressed inside the tool body while the other gliders are fully extended.

The above-described suspension system allows for independent glider 606 motion according to the geometry of the borehole. The gliders 606 are designed to be able to fully compress inside the tool body 604 while the links 618, 620 are fully rotated in the extension position. The complete gliders/suspension system may be integrated into any of the tool designs described herein or may be added as an independent module. Additionally, although only shown as having two sets 608, 610, multiple sets of gliders 606 may be repeated along the tool 600. As explained with respect to FIGS. 5a-5d, the use of a circular rack 612 allows for the positioning of the pinions 616 at any angle. In addition, the geometry of the whole system can be adjusted, scaled or modified to suit the specific application. Also, other actuation methods may be employed in place of or in addition to the rack 612, such as a complete linkage system for certain applications.

Figure 7A:
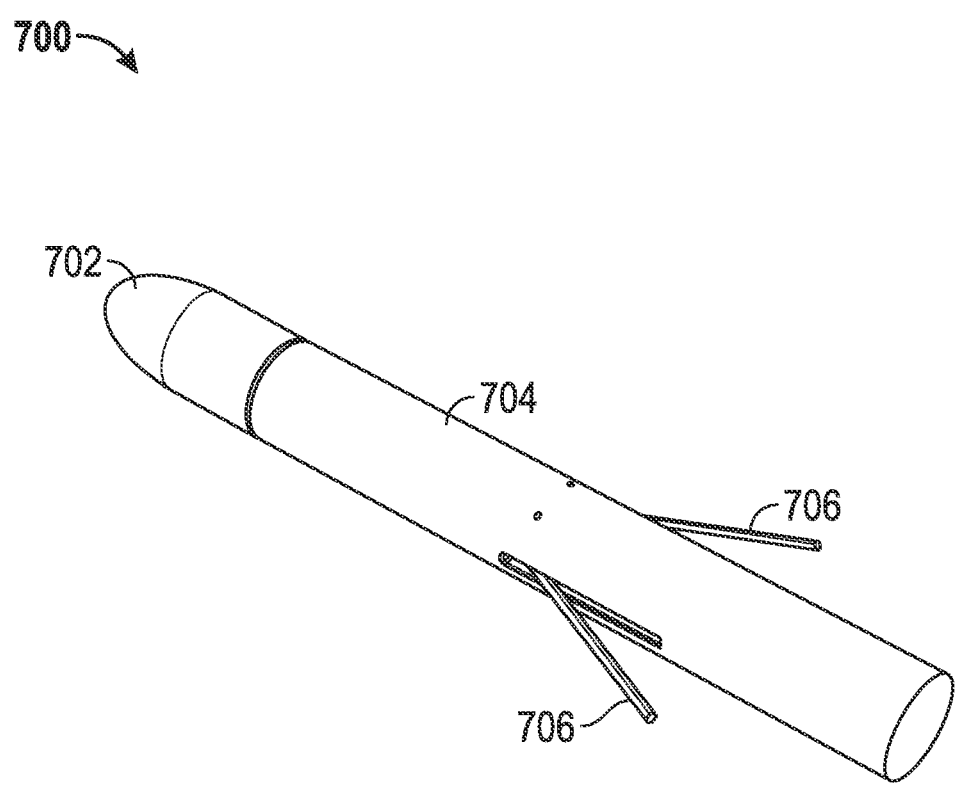
FIG. 7a is a partial cross-sectional side view of an embodiment of a downhole tool in accordance with the principles described herein including extendable arm break-free mechanisms.

FIGS. 7a-7c illustrate a downhole tool 700 that utilizes the axial movement of the tool tip or nose 702 relative to the tool body 704 resulting from an impact with an obstruction in the borehole to actuate and radially extend arms 706 to facilitate movement of the tool 700 around obstacles in the borehole. As shown in FIG. 7b, the tool tip 702 has a rod 708 attached to it, and the rod 708 has two arms 706 pivotally coupled to its end. Each arm 706 rides on a roller 710. In the depicted embodiment, a spring 709 opposes axial compression of the tool tip to allow the tool tip 702 to return to an extended position when not in contact with an obstacle.

As shown in FIG. 7c, axial compression of the tool tip 702 moves the rod 708, which in turn pushes the arms 706. The arms 706 move on the rollers 710 to extend outside the tool body 704. Upon engagement with the borehole, the arms 706 will simultaneously urge the tool 700 away from the formation and push it forward, thereby enabling the tool 700 to pass over the obstacle.

The arms 706 can be arranged in a variety of different ways around the tool body 704. In this embodiment, only two circumferentially-spaced arms 706 are shown; however, in general, any number and spacing of arms may be provided depending on a variety of a factors including, for example, the size of the tool 700. In addition, the arms 706 can be placed at any angle along the tool body 704. Also, a similar mechanism employing the arms 706 may be modulated and added to other complete tools as an independent module. The size, shape, travel and stroke of the arms 706 may be modified depending on the requirements of the particular application.

Figure 8A:
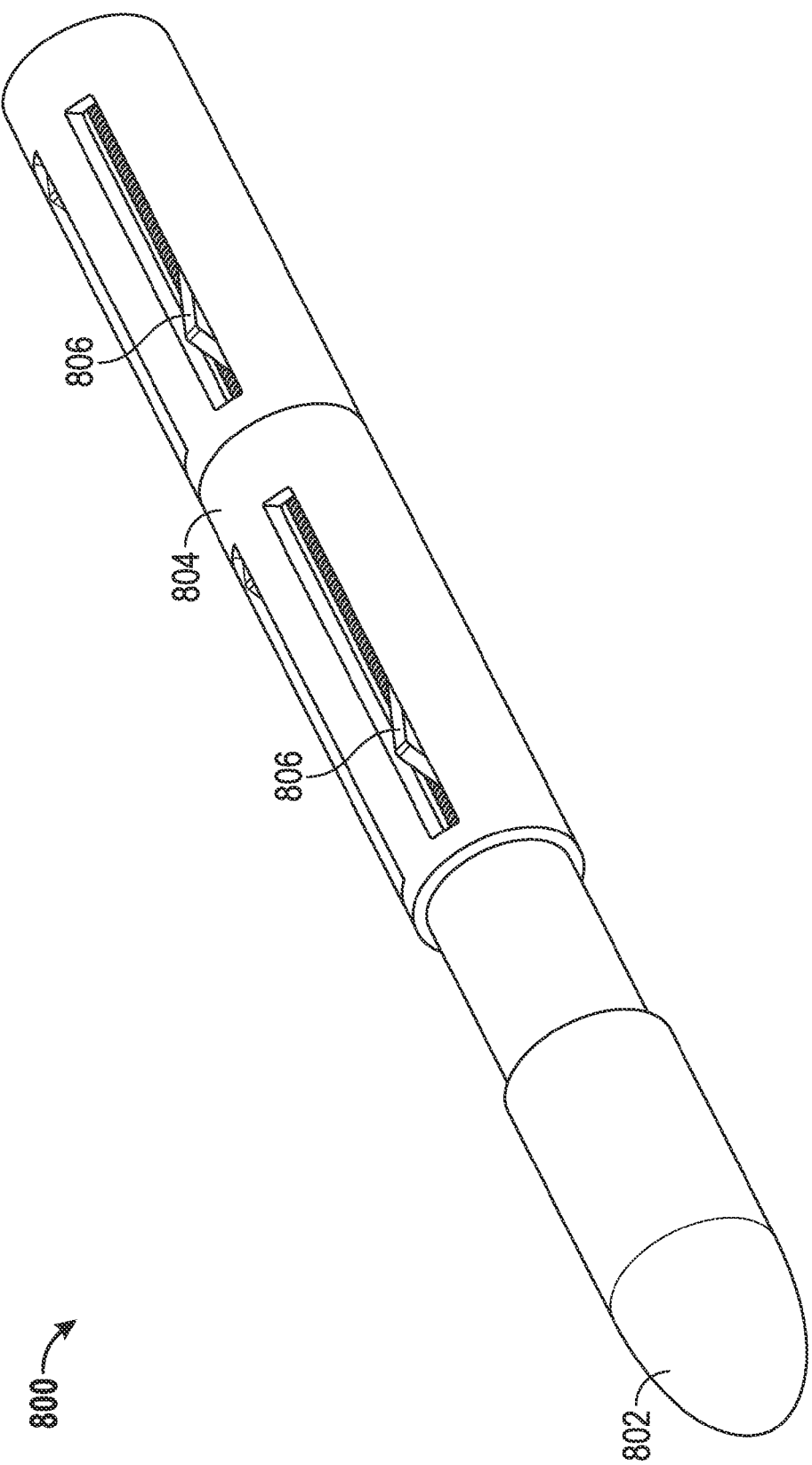
FIG. 8a is a perspective view of an embodiment of a downhole tool in accordance with the principles described herein including extendable leg break-free mechanisms.
Figure 8B:
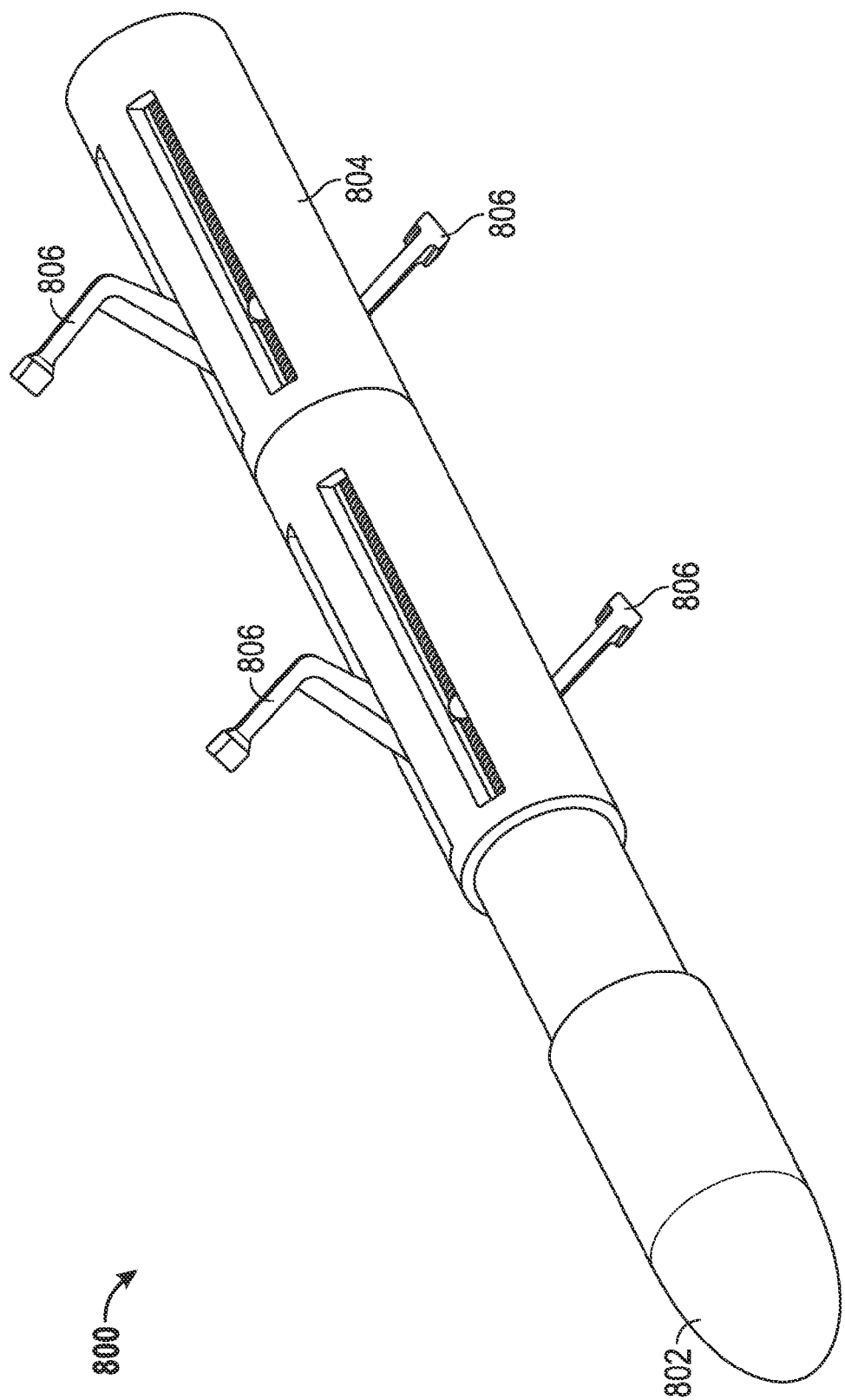
FIG. 8b is a perspective view of the tool of FIG. 8a with the legs extended.
Figure 8C:
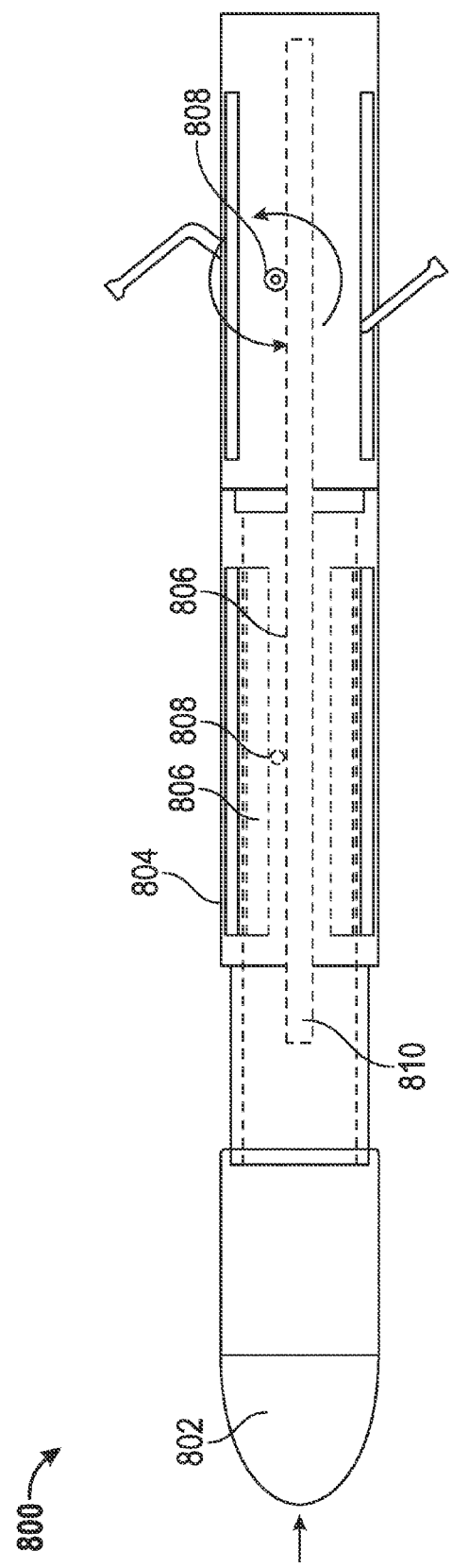
FIG. 8c is a partial cross-sectional side view of the tool of FIG. 8a with the arms extended.

FIGS. 8a-8c illustrate a downhole tool 800 that utilizes the axial movement of the tool tip or nose 802 relative to the tool body 804 resulting from an impact with an obstruction in the borehole to actuate and radially extend a plurality of legs 806 to facilitate movement of the tool 800 around obstacles in the borehole. FIG. 8a shows the legs 806 in a retracted position while FIG. 8b shows the legs 806 in an extended position. The nose 802 may be biased (e.g., using a spring) such that when not in contact with an obstacle, the nose 802 is in an extended position.

As shown in FIG. 8c, several small legs 806 are placed within the tool body 804. Each leg 806 is attached to a pinion gear 808. A rack 810 is attached to the tool tip 802 such that when the tool tip 802 is compressed and the rack 810 moves axially, the rack 810 rotates the pinions 808 thus pushing the legs 806 outside the 804 body causing them to raise and push the tool 800 forward. In some embodiments, the legs 806 are placed with different orientations inside the tool body 804 so the legs 806 operate in a crab-like motion. In some embodiments, the legs 806 continue to rotate as long as the tip 802 is retracting; then, a ratchet (not shown) attached to the pinion gears 808 will disengage the legs 806 when the tip 802 extends back to its resting position (e.g., by a spring return), thereby causing the legs 806 to retract back inside the tool body 804. Although shown with a particular geometry, the legs 806 may take many different geometries including different numbers of leg sections, angles between leg sections and the like.

In certain embodiments, the tool 800 may use different articulation methods to drive the legs 806. For example, a driving rack as shown, a linkage system, or various combinations of levers and pulleys may be employed to drive the legs 806. Additionally, the general design of the legs 806 including their size, reach and location on and along the tool 800 can all be varied according to the application. As with the tools explained above, the design of tool 800 can be used as a dedicated tool or as an independent module on another tool.

Figure 9A:
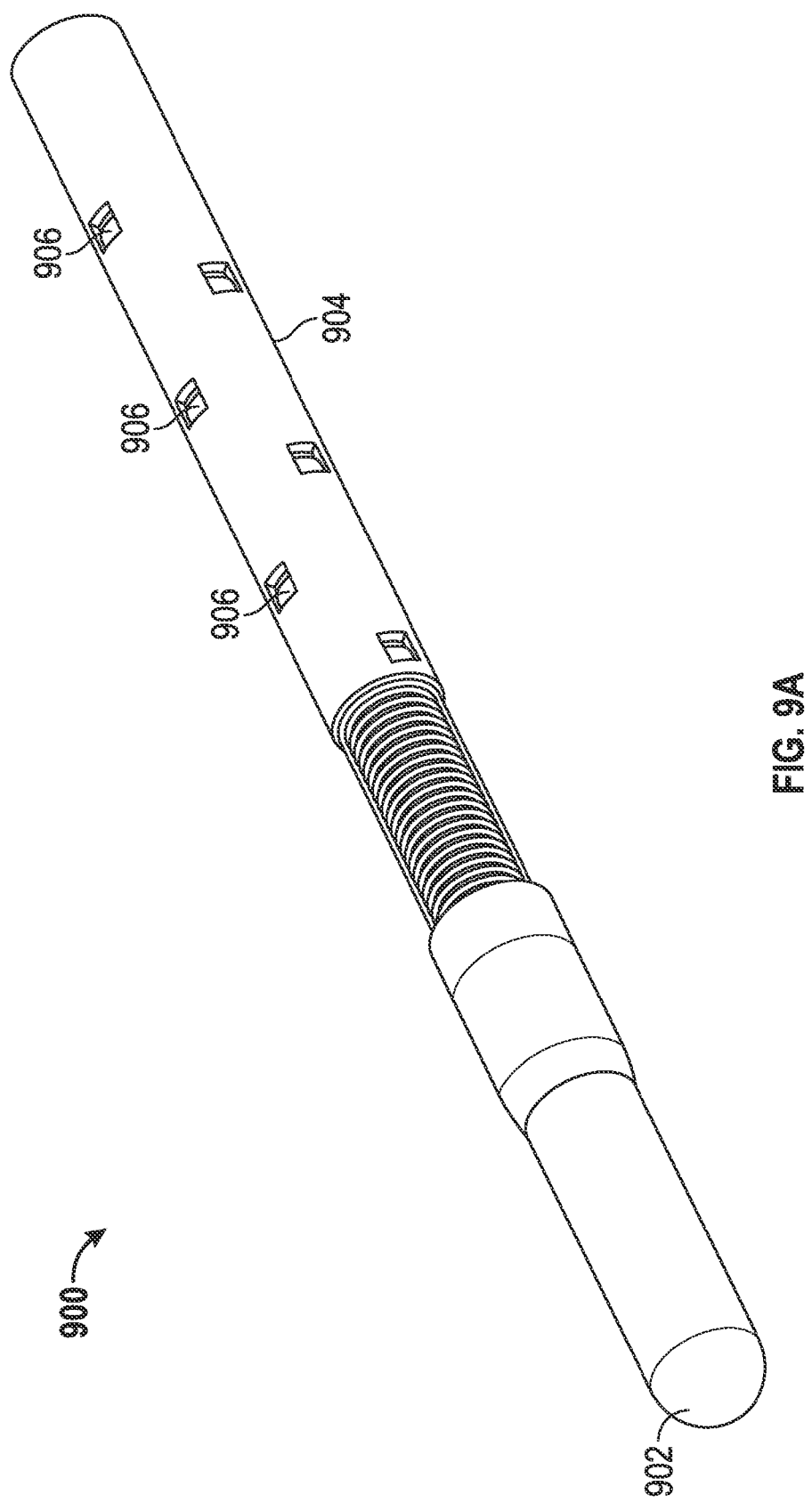
FIG. 9a is a perspective view of an embodiment of a downhole tool in accordance with the principles described herein including extendable roller break-free mechanisms.
Figure 9B:
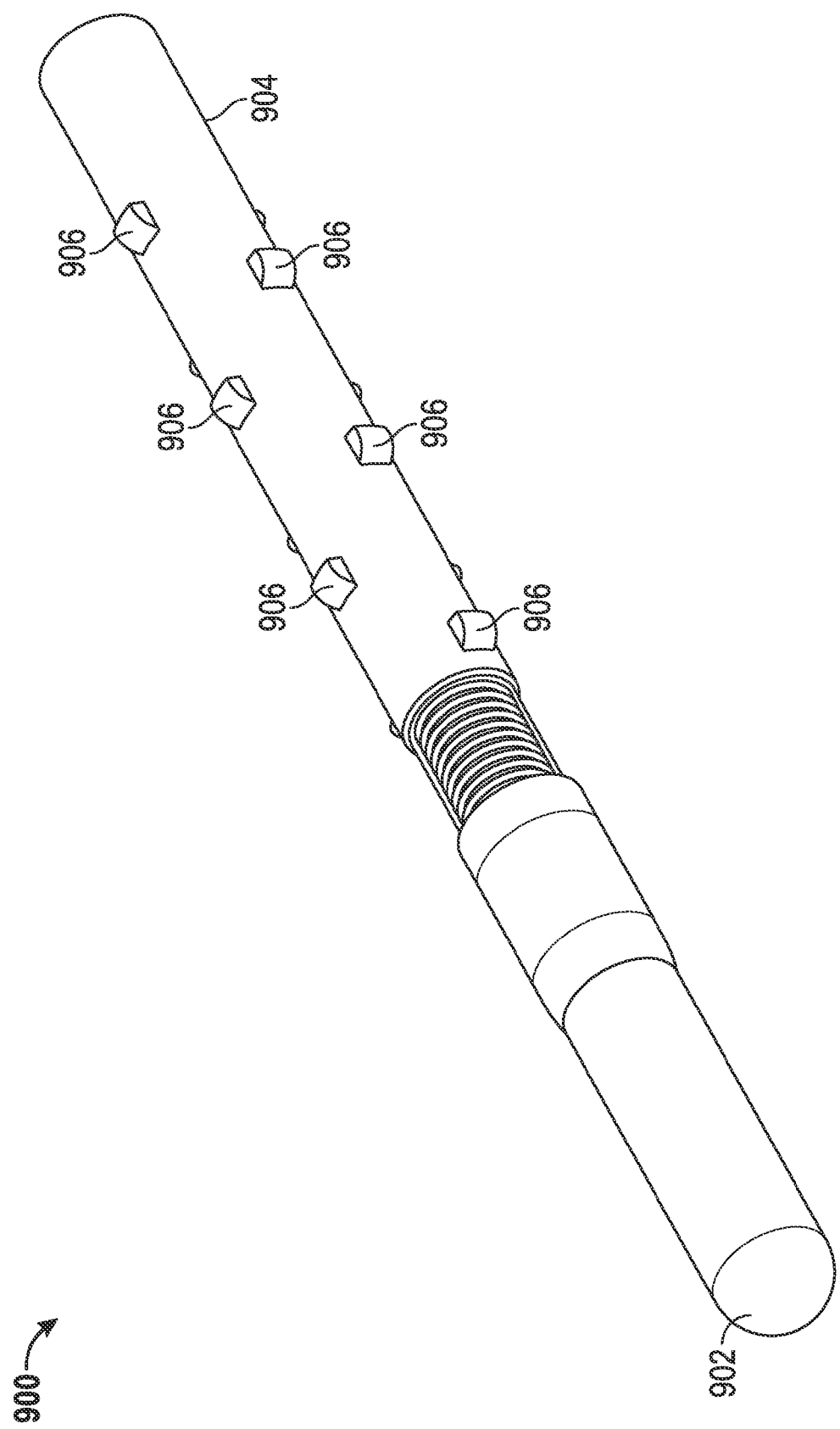
FIG. 9b is a perspective view of the tool of FIG. 8a with the rollers extended.
Figure 9C:
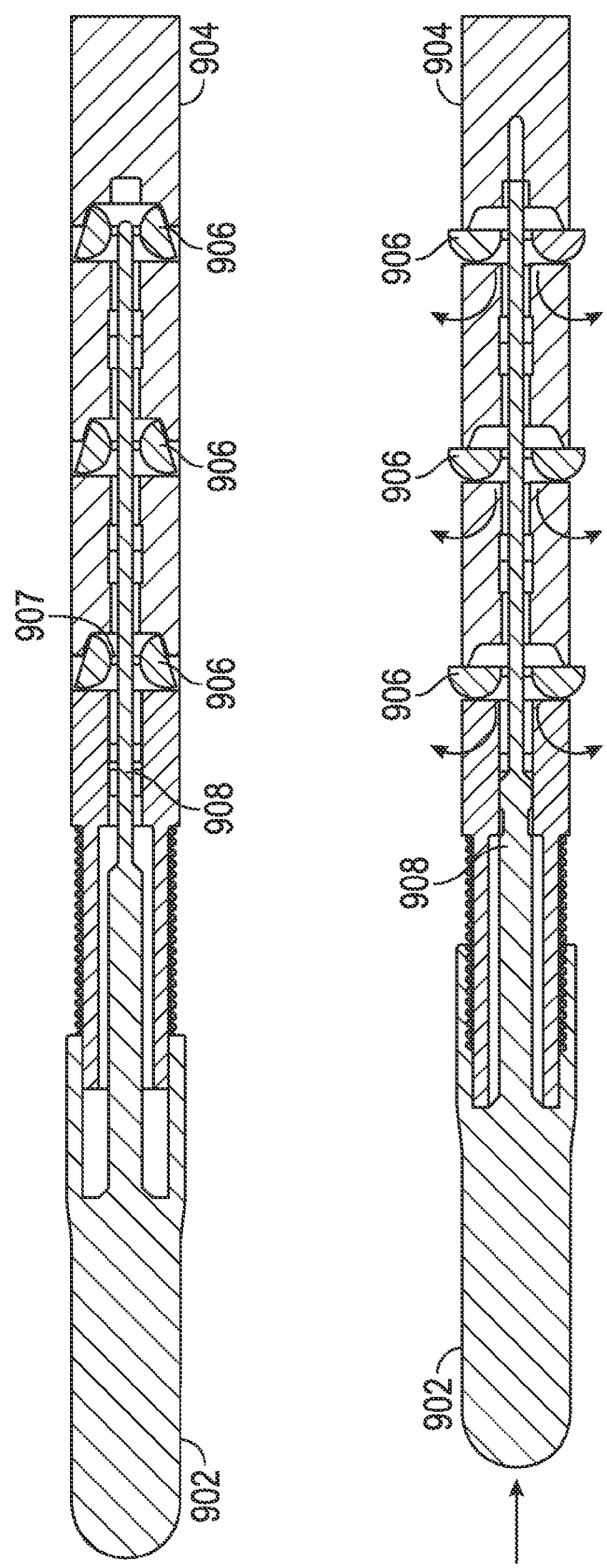
FIG. 9c illustrates cross-sectional side views of the tool of FIG. 8a with the wheels retracted and extended.

FIGS. 9a-9c illustrate a downhole tool 900 that utilizes the axial movement of the tool tip or nose 902 relative to the tool body 904 resulting from an impact with an obstruction in the borehole to actuate and radially extend a plurality of wheels or rollers 906 to facilitate movement of the tool 900 around obstacles in the borehole. In this embodiment, a plurality of semi-circular rollers 906 rotate to extend outside the tool body 904 upon impact with an obstruction, as shown in FIG. 9b. The nose 902 may be biased (e.g., using a spring) such that when not in contact with an obstacle, the nose 902 is in an extended position.

FIG. 9c shows the effect of the tip 902 being axially compressed relative to the tool body 904, for example after contacting an obstruction in the borehole. In particular, the tip 902 retracts after an impact and moves an attached arm 908, which drives a set of driving rollers 907 rotatably coupled to the tool body 904. The driving rollers 907 rotate the semi-circular wheels or rollers 906 outside the tool body 904 to urge it away from the obstruction and push it forward. In general, the shape, dimensions and location of the wheels can be tailored to suit the application.

In this embodiment, the semi-circular geometry of the wheels 906 offers the potential to grip between the wheels 906 and the formation. The wheels 906 can either be deployed simultaneously or sequentially. This design may be particularly suitable for tight boreholes or borehole sections because the wheels 906 are relatively compact and can be placed around and along the tool body 904 in any orientation. The system may be integrated as modules within or attached to any other tools and can be used as an independent dedicated tool.

In the embodiments described above, axial compression and movement of a tool nose or tip upon impact with a borehole obstruction actuates mechanisms that allow the tool to pivot or bend around the obstruction and/or urge the tool away from the obstruction, thereby allowing the tool to pass the obstruction. Studies and simulations indicate that the design of the nose or tip can have a significant effect on the performance of the tool. A variety of different types of noses that may be used in connection with any of the embodiments described herein will now be described.

Figure 10:
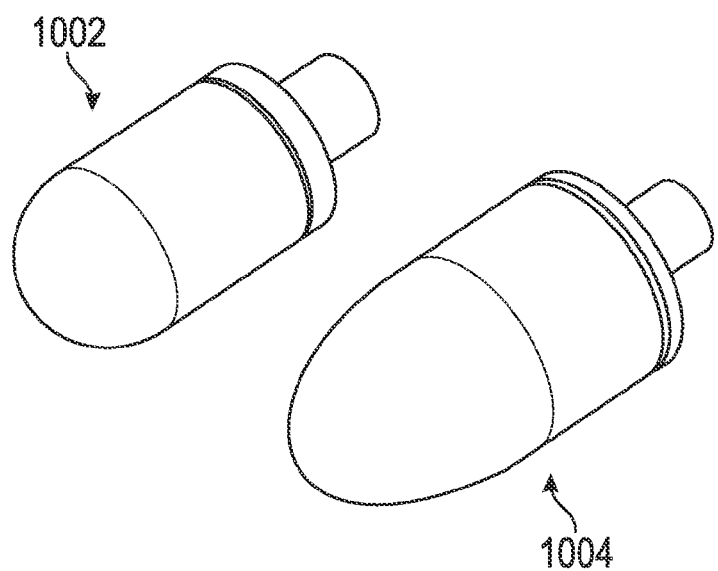
FIG. 10 illustrates perspective views of two embodiments of plain noses or tips that may be used with embodiments of downhole tools described herein.

FIG. 10 illustrates two embodiments of plain tips 1002 and 1004, which represent a more basic design. The plain tips are preferably spherical (1002) or ellipsoidal (1004) in shape, and are preferably made of a solid alloy steel. However, other materials and geometries are within the scope of the present disclosure.

Figure 11:
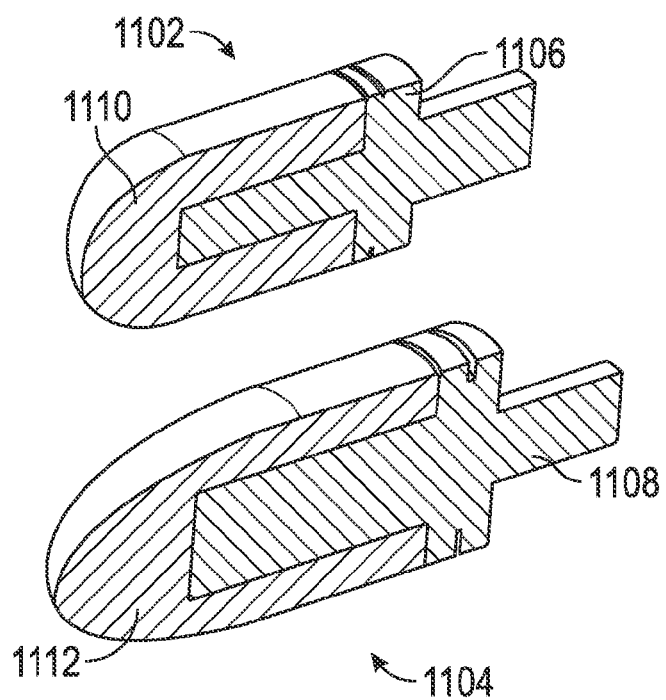
FIG. 11 illustrates perspective views of two embodiments of Teflon capped noses or tips that may be used with embodiments of downhole tools described herein.

FIG. 11 illustrates two embodiments of Teflon capped tips 1102, 1104. These embodiments are similar to the plain tips previously described, but are made out of a steel alloy core 1106, 1108 which is covered with a spherical or ellipsoidal Teflon cap 1110, 1112 to ease gliding of the tip 1102, 1104 over borehole obstructions. In other embodiments, the Teflon cap 1110, 1112 may be replaced with a rubber cap.

Figure 12:
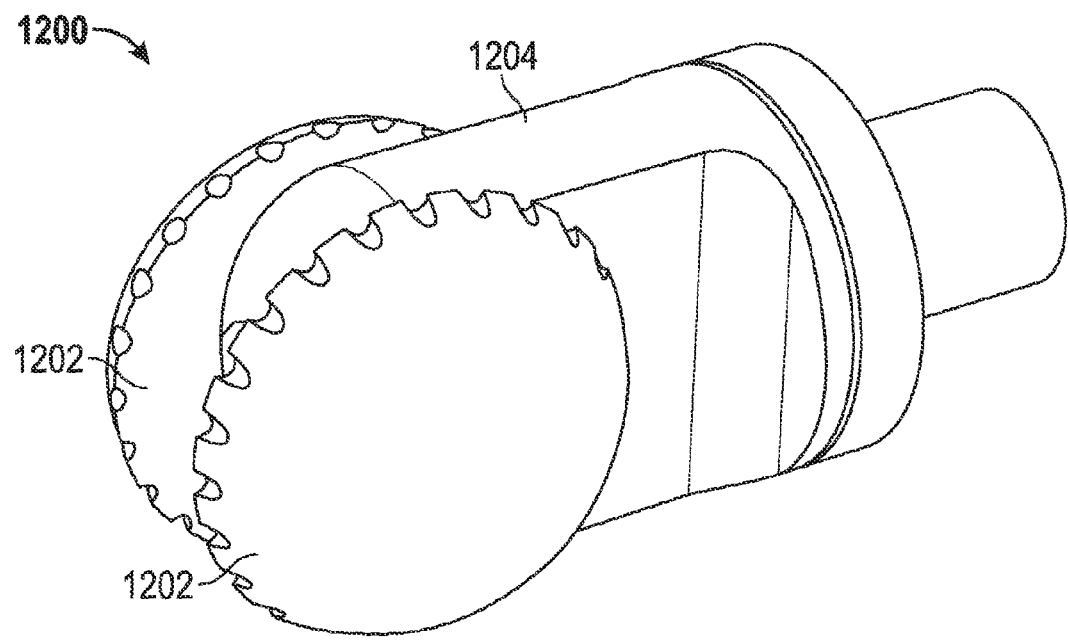
FIG. 12 is a perspective view of an embodiment of a roller tip that may be used with embodiments of downhole tools described herein.

FIG. 12 illustrates an embodiment of a roller tip 1200. In this embodiment, a roller 1202 is placed at the front end of the tip 1200. In general, the diameter of the roller 1202 will vary according to application and can be as small as a tool body 1204 diameter. The roller 1202 allows the tip 1200 to roll over obstacles and/or slide if tipped on its side.

Figure 13:
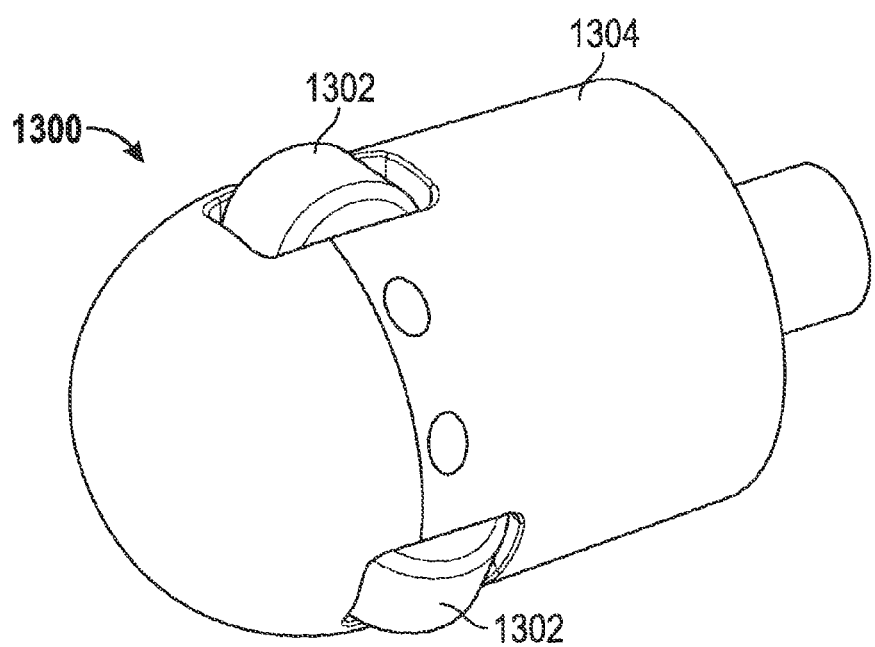
FIG. 13 is a perspective view of an embodiment of a multi-roller tip that may be used with embodiments of downhole tools described herein.

FIG. 13 illustrates an embodiment of a multi-roller tip 1300. In this embodiment, a plurality of rollers 1302 are integrated into a tip body 1304 to allow the tip 1300 to roll over obstacles regardless of its orientation. The rollers 1302 may be repeated along the length of the tip if desired. In addition, the radial orientation may be changed according to the application. The number of rollers 1302, their size, orientation and material composition may also vary with the tool size and the application.

Figure 14A:
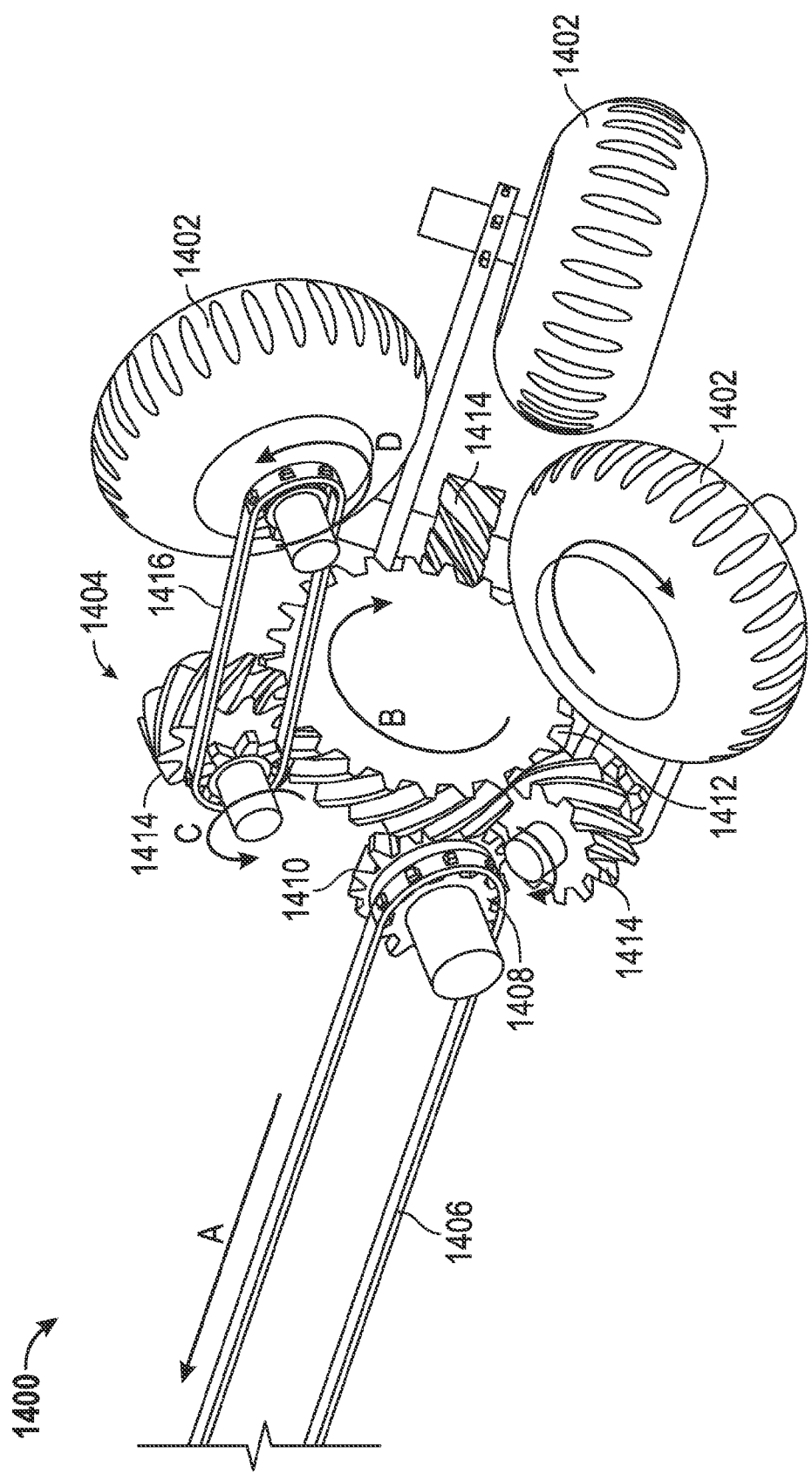
FIG. 14a is a schematic perspective view of an impact driven multi-roller tip that may be used with embodiments of downhole tools described herein.
Figure 14B:
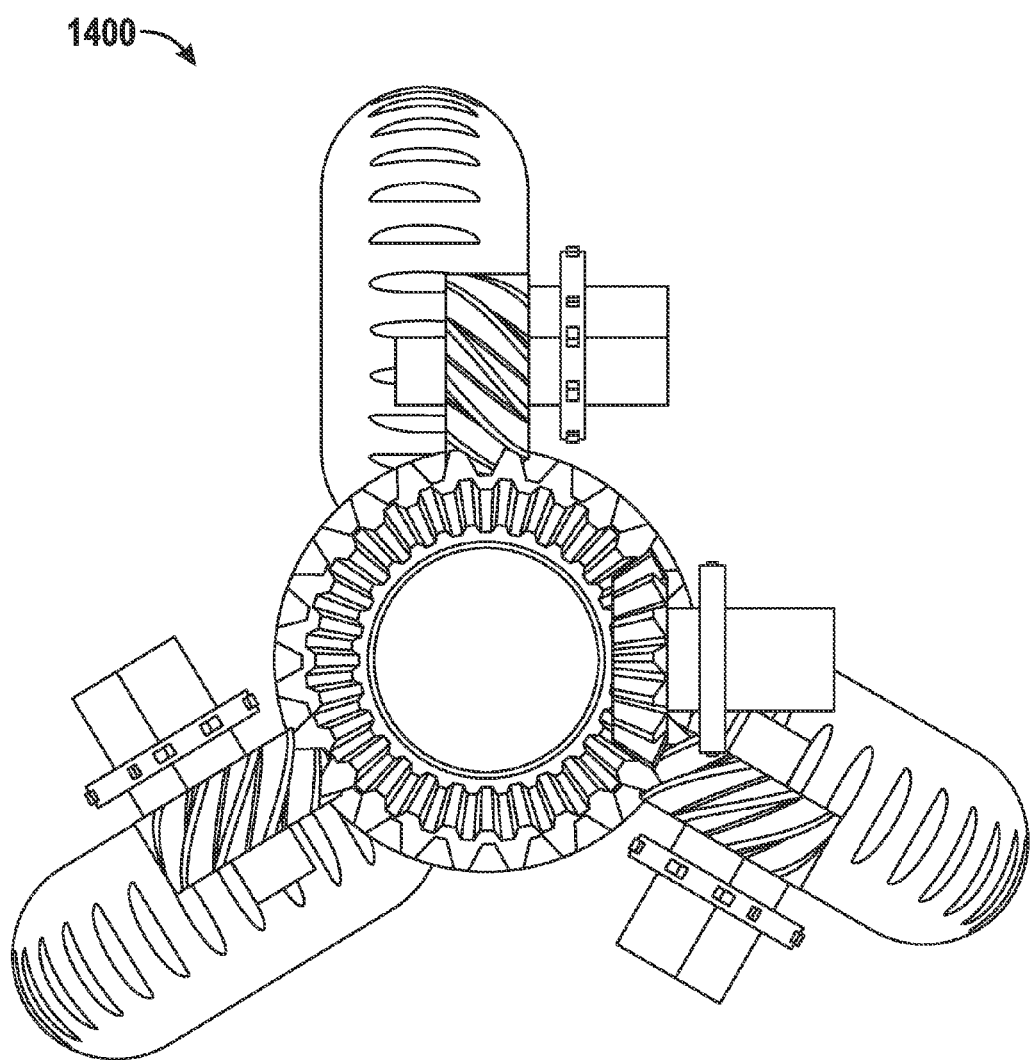

FIGS. 14a and 14b illustrate different views of an embodiment of an impact driven multi-roller tip 1400. This embodiment is similar to the passive multi-roller tips 1200, 1300 previously described, with the main difference being that in this embodiment, rollers 1402 are connected to a gearbox 1404 which is driven by an impact to the tip. When the tip is axially compressed, an attached chain 1406 rotates a bevel pinion 1408, which is attached to a bevel gear 1410. The bevel gear 1410 engages a helical gear 1412 that, in the depicted embodiment, correspondingly engages three perpendicular helical gears 1414. Each perpendicular helical gear 1412 is arranged such that it is connected to one of the rollers 1402, for example via a chain, a belt, or a flexible shaft 1416.

Thus, the linear motion of the tip from impact moves the chain 1406 which rotates the bevel pinion 1408 and bevel gear 1410 (as shown by step A). The rotation of the bevel pinion 1408 and bevel gear 1410 induces a rotation of the helical gear 1412 (as shown by step B). The rotation of the helical gear 1412 induces a rotation of the three perpendicular helical gears 1414 (as shown by step C) and thus the rotation of the rollers via the chain, a belt or a flexible shaft 1416 (as shown by step D).

Embodiments of mechanisms described herein can be used as dedicated tools or as add-on modules to existing tools. In addition, embodiments of tips described herein can be combined to be used with any of the aforementioned concepts. In general, embodiments described herein rely on axial compression and movement of a tool tip resulting from an impact with an obstruction to generate a specific action that can ease the ability of a tool to pass around the obstruction in the borehole or through a rugose borehole section.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of this disclosure. For example, the relative dimensions of various parts, the materials from which the various parts are made, and other parameters can be varied. As a specific example, in some embodiments the nose of the various telebending tools may be constructed of Teflon™, rubber, or may comprise one or more wheels that further aid the nose in avoiding an obstruction in the wellbore. As yet another example, although the coil springs of the various embodiments are shown as being exposed, the coil springs may be covered by a fairing or cover to isolate the coil springs from bore fluids. Accordingly, the scope of protection is not limited to the embodiments described herein, but is only limited by the claims that follow, the scope of which shall include all equivalents of the subject matter of the claims.

The disclosures of all patents, patent applications, and publications cited herein are hereby incorporated herein by reference in their entirety, to the extent that they provide exemplary, procedural, or other details supplementary to those set forth herein. In addition, the attached Appendix is hereby incorporated herein by reference in its entirety for all purposes.

What is claimed is:

1. A telebending tool for conveying a logging tool into a wellbore, comprising:
a tool body configured to couple to the logging tool, wherein the to body has a central axis;
a cam housing coupled to the tool body and having a cam pathway;
a nose coupled to the tool body through a pivoting member, wherein the nose has a central axis and is configured to move axially relative to the pivoting member, wherein the nose and the pivoting member are configured to pivot relative to the tool body; and
a camming arm coupled to the nose and extending coaxially through the pivoting member to selectively engage the cam pathway of the cam housing;
wherein the nose has a first position with the central axis of the nose coaxially aligned with the central axis of the to body and a second position with the central axis of the nose oriented at an angle less than 180° relative to the central axis of the tool body;
wherein the nose is configured to move axially toward the pivoting member in response to an impact with an obstruction in the wellbore;
wherein the camming arm is configured to move into engagement with the cam pathway in response to the nose moving axially toward the pivoting member and pivot the nose from the first position to the second position.

2. The telebending tool of claim 1 wherein the cam pathway has a central axis oriented at an acute angle relative to a longitudinal axis of the telebending tool.

3. The telebending tool of claim 1 wherein the pivoting member is coupled to the tool body with a hinge connection.

4. The telebending tool of claim 1 further comprising a swivel housing that couples the tool body to the logging tool, wherein the tool body couples to a swivel arm that engages the swivel housing and allows the tool body to rotate relative to the swivel housing.

5. The telebending tool of claim 4 wherein the tool body rotates relative to the swivel housing in response to the force applied to the nose.

6. The telebending tool of claim 1 wherein the cam housing is rotatably coupled to the tool body to axially rotate relative to the tool body.

7. The telebending tool of claim 6 wherein the cam housing rotates relative to the tool body in response to the force applied to the nose.

8. The telebending tool of claim 6 wherein the pivoting member couples to the tool body by a ball-and-socket connection.

9. The telebending tool of claim 1 wherein the nose has a convex semi-spherical geometry.

10. The tool of claim 1, wherein the nose comprises a polytetrafluoroethylene or rubber cap.

11. The tool of claim 1, wherein the nose comprises a roller nose, a multi-roller nose, or an impact driven multi-roller nose.

12. A telebending tool for conveying a tool into a wellbore, comprising:
a first stage comprising:
a nose coupled to a first tool body through a first pivoting member, wherein the nose has a central axis and the first tool body has a central axis;
a first cam housing coupled to the first tool body and having a cam pathway;
a first compression spring between the nose and the first pivoting member; and
a first camming arm coupled to the nose and extending coaxially through the first pivoting member to selectively engage the cam pathway of the first cam housing;
wherein the nose has a first position with the central axis of the nose coaxially aligned with the central axis of the first tool body and a second position with the central axis of the nose oriented at an angle less than 180° relative to the central axis of the first tool body;
wherein the nose is configured to move axially toward the pivoting member and pivot from the first position to the second position in response to an impact with an obstruction in the wellbore;
a second stage comprising:
the first tool body coupled to a second tool body through a second pivoting member, the second tool body having a central axis;
a second cam housing coupled to the second tool body and having a cam pathway;
a second compression spring between the first tool body and the second pivoting member; and
a second camming arm coupled to the first tool body and extending coaxially through the second pivoting member to selectively engage the cam pathway of the second cam housing;
wherein the first tool body has a first position with the central axis of the first tool body coaxially aligned with the central axis of the second tool body and a second position with the central axis of the first tool body oriented at an angle less than 180° relative to the central axis of the second tool body;
wherein the first tool body is configured to pivot from the first position to the second position in response to the impact of the nose with the obstruction in the wellbore.

13. The dual-stage telebending tool of claim 12 wherein a spring constant of the first compression spring is equal to a spring constant of the second compression spring.

14. The dual-stage telebending tool of claim 12 wherein a spring constant of the first compression spring is greater than a spring constant of the second compression spring.

15. The dual-stage telebending tool of claim 12 wherein a spring constant of the first compression spring is less than a spring constant of the second compression spring.

16. The dual-stage telebending tool of claim 12 wherein the cam pathways of the first and second cam housing are arranged in the same plane such that the first pivoting member and the nose pivot relative to the first tool body in the same plane that the first tool body and the second pivoting member pivot relative to the second tool body.

17. The dual-stage telebending tool of claim 12 wherein the cam pathways of the first and second cam housing are arranged in different planes such that the first pivoting member and the nose pivot relative to the first tool body in plane that is different from the plane that the first tool body and the second pivoting member pivot relative to the second tool body.

18. The dual-stage telebending tool of claim 17 wherein the planes are arranged 90 degrees apart.

19. The telebending tool of claim 17 wherein the nose has a convex semi-spherical geometry.

* * * * *